US012506272B2

(12) United States Patent
Blauert

(10) Patent No.: US 12,506,272 B2
(45) Date of Patent: Dec. 23, 2025

(54) PRODUCTION-TOLERANT MULTI-PART ANTENNA SYSTEM

(71) Applicant: Aptiv Technologies AG, Schaffhausen (CH)

(72) Inventor: John Karl Blauert, Carmel, IN (US)

(73) Assignee: Aptiv Technologies AG, Schaffhausen (CH)

( * ) Notice: Subject to any disclaimer, the term of this patent is extended or adjusted under 35 U.S.C. 154(b) by 302 days.

(21) Appl. No.: 18/318,379

(22) Filed: May 16, 2023

(65) Prior Publication Data

US 2024/0388002 A1 Nov. 21, 2024

(51) Int. Cl.
*H01Q 13/18* (2006.01)
*H01Q 21/06* (2006.01)
*H01Q 1/32* (2006.01)

(52) U.S. Cl.
CPC ........... *H01Q 13/18* (2013.01); *H01Q 21/061* (2013.01); *H01Q 1/3233* (2013.01)

(58) Field of Classification Search
CPC .... H01Q 13/18; H01Q 21/061; H01Q 1/3233; G01S 7/03; H01P 3/123
See application file for complete search history.

(56) References Cited

U.S. PATENT DOCUMENTS

| | | | |
|---|---|---|---|
| 2,840,818 | A | 6/1958 | Reed et al. |
| 3,462,713 | A | 8/1969 | Knerr |
| 3,579,149 | A | 5/1971 | Ramsey |
| 4,157,516 | A | 6/1979 | Grijp |
| 4,453,142 | A | 6/1984 | Murphy |
| 4,562,416 | A | 12/1985 | Sedivec |
| 5,065,123 | A | 11/1991 | Heckaman et al. |

(Continued)

FOREIGN PATENT DOCUMENTS

| | | | |
|---|---|---|---|
| CA | 2654470 | A1 | 12/2007 |
| CN | 1620738 | A | 5/2005 |

(Continued)

OTHER PUBLICATIONS

"Extended European Search Report", EP Application No. 23167063.9, Sep. 11, 2023, 12 pages.

(Continued)

*Primary Examiner* — Seokjin Kim
(74) *Attorney, Agent, or Firm* — Harness, Dickey & Pierce

(57) ABSTRACT

This document describes high-tolerance channels for multi-part waveguide and antenna. Two structures with planar surfaces are arranged about a separation plane. The planar surfaces are contoured to shape, respectively, an upper channel section and a complementary, lower channel section from an opposite side of the separation plane. Surface features on one or both planar surfaces are shaped to provide physical dimensions (e.g., length, width, and height) for a channel between the upper and lower channel sections. When arranged about the separation plane, the two structures configure an electromagnetic (EM) energy path to propagate a desired EM energy through the channel. At least one of the surface features is shaped to compensate the physical dimensions for achieving different path dimensions inside the channel to enable the EM energy path for propagating the desired wavelength or frequency of EM energy about the separation plane.

20 Claims, 8 Drawing Sheets

(56) References Cited

U.S. PATENT DOCUMENTS 5,350,499 A 9/1994 Shibaike et al.
5,414,394 A 5/1995 Gamand et al.
5,637,521 A 6/1997 Rhodes et al.
5,923,225 A 7/1999 Santos
5,929,728 A 7/1999 Barnett et al.
5,982,250 A 11/1999 Hung et al.
5,982,256 A 11/1999 Uchimura et al.
5,986,527 A 11/1999 Ishikawa et al.
6,064,350 A 5/2000 Uchimura et al.
6,072,375 A 6/2000 Adkins et al.
6,127,901 A 10/2000 Lynch
6,414,573 B1 7/2002 Swineford et al.
6,489,855 B1 12/2002 Kitamori et al.
6,535,083 B1 3/2003 Hageman et al.
6,622,370 B1 9/2003 Sherman et al.
6,658,233 B1 12/2003 Ikeda
6,788,918 B2 9/2004 Saitoh et al.
6,794,950 B2 9/2004 Toit et al.
6,859,114 B2 2/2005 Eleftheriades et al.
6,867,660 B2 3/2005 Kitamori et al.
6,958,662 B1 10/2005 Salmela et al.
6,995,726 B1 2/2006 West et al.
7,142,165 B2 11/2006 Sanchez et al.
7,276,988 B2 10/2007 Stoneham
7,420,442 B1 9/2008 Forman
7,439,822 B2 10/2008 Shimura et al.
7,495,532 B2 2/2009 McKinzie, III
7,626,476 B2 12/2009 Kim et al.
7,659,799 B2 2/2010 Jun et al.
7,886,434 B1 2/2011 Forman
7,973,616 B2 7/2011 Shijo et al.
7,994,879 B2 8/2011 Kim et al.
8,013,694 B2 9/2011 Hiramatsu et al.
8,089,327 B2 1/2012 Margomenos et al.
8,159,316 B2 4/2012 Miyazato et al.
8,395,552 B2 3/2013 Geiler et al.
8,451,175 B2 5/2013 Gummalla et al.
8,451,189 B1 5/2013 Fluhler
8,680,936 B2 3/2014 Purden et al.
8,692,731 B2 4/2014 Lee et al.
8,717,124 B2 5/2014 Vanhille et al.
8,803,638 B2 8/2014 Kildal
8,948,562 B2 2/2015 Norris et al.
9,007,269 B2 4/2015 Lee et al.
9,203,155 B2 12/2015 Choi et al.
9,246,204 B1 1/2016 Kabakian
9,258,884 B2 2/2016 Saito
9,356,238 B2 5/2016 Norris et al.
9,450,281 B2 9/2016 Kim
9,647,313 B2 5/2017 Marconi et al.
9,653,773 B2 5/2017 Ferrari et al.
9,673,532 B2 6/2017 Cheng et al.
9,806,393 B2 10/2017 Kildal et al.
9,813,042 B2 11/2017 Xue et al.
9,843,301 B1 12/2017 Rodgers et al.
9,935,065 B1 4/2018 Baheti et al.
9,947,981 B1 4/2018 Strassner et al.
9,991,606 B2 6/2018 Kirino et al.
9,997,842 B2 6/2018 Kirino et al.
10,027,032 B2 7/2018 Kirino et al.
10,042,045 B2 8/2018 Kirino et al.
10,090,600 B2 10/2018 Kirino et al.
10,114,067 B2 10/2018 Lam et al.
10,153,533 B2 * 12/2018 Kirino .................... H01P 1/182
10,158,158 B2 12/2018 Kirino et al.
10,164,318 B2 12/2018 Seok et al.
10,164,344 B2 12/2018 Kirino et al.
10,218,078 B2 2/2019 Kirino et al.
10,230,173 B2 3/2019 Kirino et al.
10,263,310 B2 4/2019 Kildal et al.
10,312,596 B2 6/2019 Gregoire
10,320,083 B2 6/2019 Kirino et al.
10,333,227 B2 6/2019 Kirino et al.
10,374,323 B2 8/2019 Kamo et al.
10,381,317 B2 8/2019 Maaskant et al.
10,381,741 B2 8/2019 Kirino et al.
10,439,298 B2 10/2019 Kirino et al.
10,468,736 B2 11/2019 Mangaiahgari
10,505,282 B2 12/2019 Lilja
10,534,061 B2 1/2020 Vassilev et al.
10,559,889 B2 2/2020 Kirino et al.
10,594,045 B2 3/2020 Kirino et al.
10,601,144 B2 3/2020 Kamo et al.
10,608,345 B2 3/2020 Kirino et al.
10,622,696 B2 4/2020 Kamo et al.
10,627,502 B2 4/2020 Kirino et al.
10,651,138 B2 5/2020 Kirino et al.
10,651,567 B2 5/2020 Kamo et al.
10,658,760 B2 5/2020 Kamo et al.
10,670,810 B2 6/2020 Sakr et al.
10,705,294 B2 7/2020 Guerber et al.
10,707,584 B2 7/2020 Kirino et al.
10,714,802 B2 7/2020 Kirino et al.
10,727,561 B2 7/2020 Kirino et al.
10,727,611 B2 7/2020 Kirino et al.
10,763,590 B2 9/2020 Kirino et al.
10,763,591 B2 9/2020 Kirino et al.
10,775,573 B1 9/2020 Hsu et al.
10,811,373 B2 10/2020 Zaman et al.
10,826,147 B2 11/2020 Sikina et al.
10,833,382 B2 11/2020 Sysouphat
10,833,385 B2 11/2020 Mangaiahgari
10,892,536 B2 * 1/2021 Fan ......................... H01Q 1/50
10,957,971 B2 3/2021 Doyle et al.
10,957,988 B2 3/2021 Kirino et al.
10,971,824 B2 4/2021 Baumgartner et al.
10,983,194 B1 4/2021 Patel et al.
10,985,434 B2 4/2021 Wagner et al.
10,992,056 B2 4/2021 Kamo et al.
11,061,110 B2 * 7/2021 Kamo ...................... G01S 7/03
11,088,432 B2 8/2021 Seok et al.
11,088,464 B2 * 8/2021 Sato .................... H01Q 21/064
11,114,733 B2 9/2021 Doyle et al.
11,121,475 B2 9/2021 Yang et al.
11,169,325 B2 11/2021 Guerber et al.
11,171,399 B2 11/2021 Alexanian et al.
11,196,171 B2 12/2021 Doyle et al.
11,201,414 B2 12/2021 Doyle et al.
11,249,011 B2 2/2022 Challener
11,283,162 B2 3/2022 Doyle et al.
11,289,787 B2 3/2022 Yang
11,349,183 B2 5/2022 Rahiminejad et al.
11,349,220 B2 5/2022 Alexanian et al.
11,378,683 B2 7/2022 Alexanian et al.
11,411,292 B2 8/2022 Kirino
11,495,871 B2 11/2022 Vosoogh et al.
11,563,259 B2 1/2023 Alexanian et al.
11,611,138 B2 * 3/2023 Ogawa ................. H01P 11/002
11,616,306 B2 3/2023 Brandenburg et al.
11,626,652 B2 4/2023 Vilenskiy et al.
2002/0021197 A1 2/2002 Elco
2004/0069984 A1 4/2004 Estes et al.
2006/0113598 A1 6/2006 Chen et al.
2006/0145777 A1 7/2006 Mueller
2008/0129409 A1 6/2008 Nagaishi et al.
2008/0150821 A1 6/2008 Koch et al.
2009/0040132 A1 2/2009 Sridhar et al.
2009/0207090 A1 8/2009 Pettus et al.
2009/0243762 A1 10/2009 Chen et al.
2010/0193935 A1 8/2010 Lachner et al.
2011/0140810 A1 6/2011 Leiba et al.
2011/0140979 A1 6/2011 Dayan et al.
2012/0013421 A1 1/2012 Hayata
2012/0050125 A1 3/2012 Leiba et al.
2012/0068316 A1 3/2012 Ligander
2012/0163811 A1 6/2012 Doany et al.
2012/0242421 A1 9/2012 Robin et al.
2012/0256707 A1 10/2012 Leiba et al.
2012/0256796 A1 10/2012 Leiba
2013/0057358 A1 3/2013 Anthony et al.
2013/0256849 A1 10/2013 Danny et al.
2014/0015709 A1 1/2014 Shijo et al.
2014/0048310 A1 2/2014 Montevirgen et al.
2014/0091884 A1 4/2014 Flatters

(56) References Cited

U.S. PATENT DOCUMENTS

| | | | | |
|---|---|---|---|---|
| 2014/0106684 | A1 | 4/2014 | Burns et al. | |
| 2015/0097633 | A1 | 4/2015 | Devries et al. | |
| 2015/0229017 | A1 | 8/2015 | Suzuki et al. | |
| 2015/0295297 | A1 | 10/2015 | Cook et al. | |
| 2015/0357698 | A1 | 12/2015 | Kushta | |
| 2015/0364804 | A1 | 12/2015 | Tong et al. | |
| 2015/0364830 | A1 | 12/2015 | Tong et al. | |
| 2016/0028164 | A1* | 1/2016 | Watanabe | H01Q 21/005 343/771 |
| 2016/0043455 | A1 | 2/2016 | Seler et al. | |
| 2016/0049714 | A1 | 2/2016 | Ligander et al. | |
| 2016/0056541 | A1 | 2/2016 | Tageman et al. | |
| 2016/0111764 | A1 | 4/2016 | Kim | |
| 2016/0118705 | A1 | 4/2016 | Tang et al. | |
| 2016/0204495 | A1 | 7/2016 | Takeda et al. | |
| 2016/0276727 | A1 | 9/2016 | Dang et al. | |
| 2016/0293557 | A1 | 10/2016 | Topak et al. | |
| 2016/0301125 | A1 | 10/2016 | Kim et al. | |
| 2017/0084554 | A1 | 3/2017 | Dogiamis et al. | |
| 2017/0099705 | A1 | 4/2017 | Mazzon | |
| 2017/0324135 | A1 | 11/2017 | Blech et al. | |
| 2018/0131084 | A1 | 5/2018 | Park et al. | |
| 2018/0226709 | A1 | 8/2018 | Mangaiahgari | |
| 2018/0226727 | A1 | 8/2018 | Sato | |
| 2018/0233465 | A1 | 8/2018 | Spella et al. | |
| 2018/0284186 | A1 | 10/2018 | Chadha et al. | |
| 2018/0301816 | A1 | 10/2018 | Kamo et al. | |
| 2018/0343711 | A1 | 11/2018 | Wixforth et al. | |
| 2018/0351261 | A1 | 12/2018 | Kamo et al. | |
| 2018/0375185 | A1 | 12/2018 | Kirino et al. | |
| 2019/0006743 | A1 | 1/2019 | Kirino et al. | |
| 2019/0013563 | A1 | 1/2019 | Takeda et al. | |
| 2019/0194452 | A1 | 6/2019 | Schrauwen | |
| 2019/0207286 | A1 | 7/2019 | Moallem | |
| 2020/0021001 | A1 | 1/2020 | Mangaiahgari | |
| 2020/0052361 | A1* | 2/2020 | Ogawa | H01P 11/002 |
| 2020/0106191 | A1* | 4/2020 | Yamaguchi | H01Q 21/064 |
| 2020/0153108 | A1 | 5/2020 | Uemichi | |
| 2020/0203849 | A1* | 6/2020 | Lim | H01P 5/12 |
| 2020/0220273 | A1 | 7/2020 | Ahmadloo | |
| 2020/0235453 | A1 | 7/2020 | Lang | |
| 2020/0287293 | A1 | 9/2020 | Shi et al. | |
| 2020/0343612 | A1 | 10/2020 | Shi | |
| 2020/0412012 | A1 | 12/2020 | Zhao et al. | |
| 2021/0028549 | A1* | 1/2021 | Doyle | H01Q 21/005 |
| 2021/0036393 | A1 | 2/2021 | Mangaiahgari | |
| 2021/0159577 | A1 | 5/2021 | Carlred et al. | |
| 2021/0305667 | A1 | 9/2021 | Bencivenni | |
| 2021/0367352 | A1 | 11/2021 | Izadian et al. | |
| 2022/0094071 | A1 | 3/2022 | Doyle et al. | |
| 2022/0109246 | A1 | 4/2022 | Emanuelsson et al. | |
| 2023/0011064 | A1* | 1/2023 | Lee | H01P 3/121 |
| 2024/0162621 | A1* | 5/2024 | Li | H01Q 1/3233 |

FOREIGN PATENT DOCUMENTS

| | | | | |
|---|---|---|---|---|
| CN | 1682404 | A | 10/2005 | |
| CN | 2796131 | | 7/2006 | |
| CN | 201383535 | | 1/2010 | |
| CN | 102696145 | A | 9/2012 | |
| CN | 103515682 | A | 1/2014 | |
| CN | 104900956 | A | 9/2015 | |
| CN | 105098295 | A | 11/2015 | |
| CN | 105609909 | A | 5/2016 | |
| CN | 105680133 | A | 6/2016 | |
| CN | 105958167 | A | 9/2016 | |
| CN | 106711616 | A | 5/2017 | |
| CN | 106785424 | A | 5/2017 | |
| CN | 109716861 | A | 5/2019 | |
| CN | 109750201 | A | 5/2019 | |
| CN | 209389219 | U | 9/2019 | |
| DE | 4241635 | A1 | 6/1994 | |
| DE | 102016213202 | A1 | 1/2018 | |
| DE | 102019200893 | A1 | 7/2020 | |
| EP | 2500978 | A1 | 9/2012 | |
| EP | 2843758 | A1 | 3/2015 | |
| EP | 2945222 | A1 | 11/2015 | |
| EP | 3460903 | A1 | 3/2019 | |
| EP | 4465440 | A1 * | 11/2024 | G01S 13/931 |
| GB | 2489950 | A | 10/2012 | |
| JP | 2000357916 | A | 12/2000 | |
| JP | 2002076716 | A | 3/2002 | |
| JP | 2003243902 | A | 8/2003 | |
| JP | 2003289201 | A | 10/2003 | |
| JP | 3923360 | B2 | 5/2007 | |
| KR | 20030031585 | A | 4/2003 | |
| KR | 20080044752 | A | 5/2008 | |
| KR | 1020080044752 | A | 5/2008 | |
| WO | 2013189513 | A1 | 12/2013 | |
| WO | 2018003932 | A1 | 1/2018 | |
| WO | 2018095541 | A1 | 5/2018 | |
| WO | 2019085368 | A1 | 5/2019 | |
| WO | 2021122725 | A1 | 6/2021 | |

OTHER PUBLICATIONS

"Extended European Search Report", EP Application No. 23167836.8, Sep. 11, 2023, 10 pages.

"Foreign Office Action", CN Application No. 202111321802.9, Jul. 29, 2023, 17 pages.

Ferrando-Rocher Miguel et al: "A Half-Mode Groove Gap Waveguide for Single-Layer Antennas in the Millimeter-Wave Band", IEEE Antennas and Wireless Propagation Letters, IEEE, Piscataway, NJ, US, vol. 21, No. 12, Jul. 27, 2022, pp. 2402-2406, XP011928651, ISSN: 1536-1225, DOI: 10.1109/LAWP.2022.3194665.

Extended European Search Report regarding Application No. 23179256.5, dated Dec. 1, 2023.

"Ferrando-Rocher Miguel et al: ""A Half-Mode Groove Gap Waveguide for Single-Layer Antennas in the Millimeter-Wave Band"", IEEE Antennas and Wireless Propagation Letters, IEEE, Piscataway, NJ, US, vol. 21, No. 12, Jul. 27, 2022 (Jul. 27, 2022), pp. 2402-2406, XP011928651, ISSN: 1536-1225, DOI: 10.1109/LAWP.2022.3194665 [retrieved on Jul. 28, 2022]".

"Ferrando-Rocher Miguel et al: ""Half-Mode Waveguide Based on Gap Waveguide Technology for Rapid Prototyping"", IEEE Microwave and Wireless Components Letters, IEEE Service Center, New York, NY, US, vol. 32, No. 2, Oct. 25, 2021 (Oct. 25, 2021), pp. 117-120, XP011900270, ISSN: 1531-1309, DOI: 10.1109/LMWC.2021.3119534 [retrieved on Feb. 10, 2022]".

"Extended European Search Report", EP Application No. 18153137.7, Jun. 15, 2018, 8 pages.

"Extended European Search Report", EP Application No. 20166797, Sep. 16, 2020, 11 pages.

"Extended European Search Report", EP Application No. 21203201.5, Apr. 7, 2022, 12 pages.

"Foreign Office Action", CN Application No. 201810122408.4, Jan. 26, 2022, 15 pages.

"Foreign Office Action", CN Application No. 201810122408.4, Jan. 30, 2023, 21 pages.

"Foreign Office Action", CN Application No. 201810122408.4, May 6, 2022, 15 pages.

"Foreign Office Action", CN Application No. 201810122408.4, Jun. 2, 2021, 15 pages.

"Foreign Office Action", CN Application No. 201810122408.4, Sep. 20, 2022, 19 pages.

"Foreign Office Action", CN Application No. 201810122408.4, Oct. 18, 2021, 19 pages.

"Foreign Office Action", CN Application No. 202111321802.9, Nov. 22, 2022, 17 pages.

Bauer, et al., "A wideband transition from substrate integrated waveguide to differential microstrip lines in multilayer substrates", Sep. 2010, pp. 811-813.

Dai, et al., "An Integrated Millimeter-Wave Broadband Microstrip-to-Waveguide Vertical Transition Suitable for Multilayer Planar Circuits", IEEE Microwave and Wireless Components Letters, vol. 26, No. 11, 2016, pp. 897-899.

(56) References Cited

OTHER PUBLICATIONS

Deslandes, et al., "Integrated Transition of Coplanar to Rectangular Waveguides", 2001 IEEE MTT-S International Microwave Sympsoium Digest, pp. 619-622.
Deutschmann, et al., "A Full W-Band Waveguide-to-Differential Microstrip Transition", Jun. 2019, pp. 335-338.
Giese, et al., "Compact Wideband Single-ended and Differential Microstrip-to-waveguide Transitions at W-band", Jul. 2015, 4 pages.
Jankovic, et al., "Stepped Bend Substrate Integrated Waveguide to Rectangular Waveguide Transitions", Jun. 2016, 2 pages.
Rajo-Iglesias, et al., "Gap Waveguide Technology for Millimeter-Wave Antenna Systems", IEEE Communications Magazine, vol. 56, No. 7, Jul. 2018, pp. 14-20.
Tong, et al., "A Vertical Transition Between Rectangular Waveguide and Coupled Microstrip Lines", IEEE Microwave and Wireless Components Letters, vol. 22, No. 5, May 2012, pp. 251-253.
Tong, et al., "A Wide Band Transition from Waveguide to Differential Microstrip Lines", Dec. 2008, 5 pages.
Topak, et al., "Compact Topside Millimeter-Wave Waveguide-to-Microstrip Transitions", IEEE Microwave and Wireless Components Letters, vol. 23, No. 12, Dec. 2013, pp. 641-643.
Wang, et al., "Mechanical and Dielectric Strength of Laminated Epoxy Dielectric Graded Materials", Mar. 2020, 15 pages.
Yuasa, et al., "A millimeter wave wideband differential line to waveguide transition using short ended slot line", Oct. 2014, pp. 1004-1007.
"Extended European Search Report", EP Application No. 22159217.3, Aug. 19, 2022, 11 pages.
"Extended European Search Report", EP Application No. 22170487.7, Sep. 8, 2022, 11 pages.
"Extended European Search Report", EP Application No. 22188348.1, Mar. 14, 2023, 8 pages.
"Foreign Office Action", CN Application No. 202111321802.9, Mar. 31, 2023, 16 pages.
"Foreign Office Action", CN Application No. 202210282861.8, Jun. 1, 2023, 13 pages.
"Foreign Office Action", EP Application No. 21203201.5, Jun. 15, 2023, 11 pages.
Ghahramani, et al., "Reducing Mutual Coupling of SIW Slot Array Antenna Using Uniplanar Compact EBG (UC-EBG) Structure", The 8th European Conference on Antennas and Propagation (EuCAP 2014), Apr. 6, 2014, pp. 2002-2004.
Henawy, et al., "Integrated Antennas in eWLB Packages for 77 GHZ and 79 GHZ Automotive Radar Sensors", 2011 41st European Microwave Conference, Oct. 10, 2011, pp. 1312-1315.
Schellenberg, et al., "CAD Models for Suspended and Inverted Microstrip", IEEE Transactions on Microwave Theory and Techniques, vol. 43, No. 6, Jun. 1995, pp. 1247-1252.

* cited by examiner

PRODUCTION-TOLERANT MULTI-PART ANTENNA SYSTEM

BACKGROUND

Antennas are used in radar systems to enable transmission and reception of electromagnetic (EM) signals for detecting objects. Metalized plastic and machined air-waveguide antennas are often used in automotive (e.g., radar) applications due to their increase in performance and low cost. Air waveguides provide isolated energy paths or channels, which given their physical dimensions, allow a specific wavelength or frequency of EM energy to propagate through air contained by the channel. Precision in each channel's physical dimensions ensures isolation of the specific wavelength or frequency of EM energy contained by that channel.

To simplify manufacturing for large-scale production (e.g., to satisfy the automotive industry), some waveguides are formed from a combination of two or more structures, each designed to form complementary parts of the channel. However, assembling a multi-part waveguide antenna to achieve the precise channel dimensions can be difficult. Even minor variations in complementary parts can cause irregularities along the channel dimensions between them, which can allow power leakage (e.g., loss in radio frequency signal transmission or reception). Power leakage reduces efficiency and isolation of the EM energy, which may lead to missed or inaccurate detections, and can result in unsafe or uncomfortable driving behavior.

SUMMARY

This document describes techniques and systems for a production-tolerant multi-part antenna system. In one example, an antenna system is described that includes two structures with parallel first and second planar surfaces arranged about a separation plane. A first planar surface is contoured to shape an upper channel section adjacent to the separation plane, and a second planar surface is contoured to shape a lower channel section, which complements the upper channel section from an opposite side of the separation plane as the first planar surface. At least one of the first and second planar surfaces includes one or more surface features to provide physical dimensions along the length of the channel. The physical dimensions include a channel width and a channel height between the upper channel section and the lower channel section. The channel width and the channel height are each relative to a channel cross section that is perpendicular to the separation plane. Further, at least one of the surface features is shaped to compensate the physical dimensions to provide an electromagnetic (EM) energy path having different path dimensions than the physical dimensions. This enables a desired wavelength or frequency of EM energy to propagate partially through the channel, despite irregularities in the physical dimensions of the channel (e.g., mismatched complementary parts, incorrect lateral or vertical alignment about the channel).

The techniques and systems described herein also provide methods related to the above-summarized system including steps executed as part of computer-implemented processes, including to manufacture the system, or operate a device that interfaces with the system, as well as means for performing the steps.

For example, a method for manufacturing the above-summarized antenna system is described. The method includes forming, using metal injection molding, a first metal structure for the antenna system. The first metal structure is formed during the metal injection molding process to have a first planar surface that is contoured to shape an upper channel section. The method also includes forming, using metal injection molding, a second metal structure for the antenna system. The second metal structure is formed during the metal injection molding process to have a second planar surface that is to be arranged parallel to the first planar surface and is contoured to shape a lower channel section to complement the upper channel section. The method includes arranging the first metal structure relative to the second metal structure on opposite sides of a separation plane defined between each metal structure. This includes aligning the first planar surface to be opposite the second planar surface relative to the separation plane, to provide physical dimensions of a channel formed between the upper channel section and the lower channel section. In forming at least one of the first structure or the second structure during the metal injection molding steps, the method includes shaping, using metal injection molding, one or more surface features on at least one of the first planar surface or the second planar surface along a length of the channel for achieving the physical dimensions of the channel including a channel width and a channel height each relative to a channel cross section that is perpendicular to the separation plane between the upper channel section and the lower channel section. In addition, during the metal injection molding steps, the method includes forming at least one of the first structure or the second structure by shaping, using metal injection molding, at least one of the surface features to compensate the physical dimensions to prevent leakage from an EM energy path having different path dimensions than the physical dimensions. The path dimensions enable a desired wavelength or frequency of EM energy to propagate through the channel, including to prevent leakage that can otherwise occur at irregularities in the physical dimensions along the length of the channel.

This Summary introduces simplified concepts related to production-tolerant multi-part antenna systems and are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a production-tolerant multi-part antenna system is described in this document with reference to the following figures. The same numbers are often used throughout the drawings to reference like features and components:

FIGS. 2-1 to 2-7 illustrate example views and concepts related to an example production-tolerant multi-part antenna system;

FIGS. 3-1 to 3-4 illustrate example views and concepts related to another example production-tolerant multi-part antenna system; and FIG. 4 illustrates an example process of forming a production-tolerant multi-part antenna system, in accordance with techniques of this disclosure.

DETAILED DESCRIPTION

Overview

Figure 1:
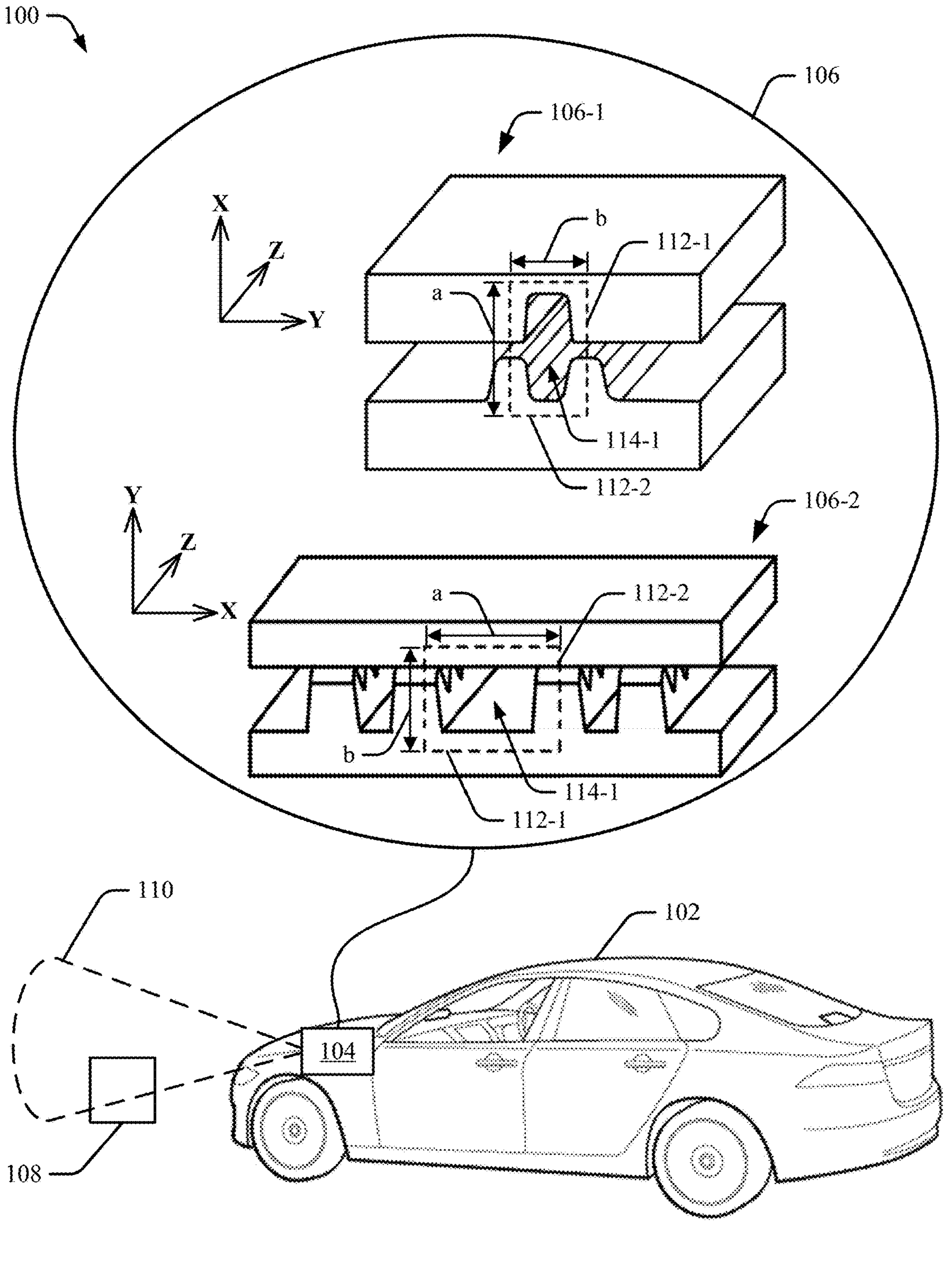
FIG. 1 illustrates an example environment for a production-tolerant multi-part antenna system, in accordance with this disclosure.

Antennas are used in radar systems, including waveguides to provide isolated electromagnetic (EM) energy paths or channels, which are tuned for propagating a specific wavelength or frequency of EM energy with the antenna. In addition, these structures can provide mechanical support or thermal advantages to the antenna system, without increasing cost. A Monolithic Microwave Integrated Circuit (MMIC) may interface with the energy path through connection between the MMIC and the conductive surfaces that form the channel. This thermal connection configures the waveguide as a heatsink for cooling the MMIC further increasing antenna performance.

Although described primarily in the context of air waveguides with channels filled with air, the techniques apply to other waveguides, as well, such as waveguides that use solids, liquids, or other gases for dielectric material fill to propagate EM energy in a channel. Use of air waveguides may be preferred for manufacturing small three-dimensional waveguide structures at large volume and low cost. However, in some applications, an increased cost and/or complexity of a non-air dielectric-filled waveguide may be used where moisture or debris can enter the channel and block or interfere with the EM energy in the channel.

Precision in physical dimensions of waveguides, including their conductive inner channel surfaces, helps ensure isolation on the energy path to tune the channel for that specific EM energy wavelength or frequency. Waveguide channels can be formed to have different shapes and physical dimensions, including various cross-sections (e.g., rectangular, square, elliptical, circular) normal a channel length. For ease of manufacturing, a channel may be approximately rectangular shaped, and characterized by a wider side, referred to as the a-dimension, and a narrower side, referred to as the b-dimension. The b-dimension is set to be less than the a-dimension, which is at least one half a desired wavelength (λ) of the EM energy within the channel. Achieving a consistent a-dimension and b-dimension about the channel length can prevent leakage from the channel and isolate a specific wavelength or frequency of EM energy to propagate through the channel. Complex machining or fabrication techniques, such as Computer Numerical Controlled (CNC) machining or three-dimensional printing, may be needed to form these structures with precision, which is not preferable for mass production due to the high cost to manufacture this way.

Accurate channel dimensions may be easier to achieve by forming waveguides between two or more structures. Each structure provides a complementary part of the channel through the waveguide. For example, two metal parts may be much easier to shape a waveguide channel between them, than shaping the channel from a single metal part. The separate structures can be different or the same material; examples of structures include printed circuit board (PCB) layers, metal plates, metalized parts, metal layers, substrates, or combinations thereof.

When separate metal structures are combined to form waveguide channels; each metal structure may be manufactured using a combination of metal stamping, metal casting, metal injection molding (e.g., magnesium or aluminum metal injection molding), metal forming, three dimensional metal forming, and/or other techniques. The separate metal structures may be panels or metal plates with planar surfaces designated to be arranged in parallel on opposite sides of a separation plane. A first metal part may shape an upper channel section in one planar surface, which is stacked relative to a lower channel section contoured in a planar surface of second metal part. When aligned correctly, the two-part combination forms a complete channel across the separation plane. Aligning the two surfaces correctly for the length of the channel configures the waveguide to achieve the physical dimensions of the channel. However, assembling an antenna system from two or more parts this way can be difficult.

Sometimes, variation in the complementary surfaces of two different structures can produce a larger separation or gap between them. For example, some existing processes for manufacturing other types of two-part metal waveguides inevitably worsen performance through introduction of a gap between the two metal plates. Even a narrow (e.g., near zero, one fourth of the desired wavelength 2) gap provided about a separation plane defined between the complementary surfaces can cause power leakage from the channel. Just a small amount of asymmetry or misalignment between complementary parts can cause a channel to have an inaccurate a-dimension and/or b-dimension where EM energy can escape. In addition, certain bonding materials may be used to secure the two parts, which despite providing a strong joint, may increase or at least not prevent EM energy leakage despite a physical connection between the two plates. Power leakage resulting from inaccurate channel dimensions reduces efficiency and isolation of the EM energy through the channel and reduces overall radar performance. A reduction in radar performance can lead to unreported or inaccurate object detections. If used to support driving a vehicle, inaccurate object detections due to radar malfunctions can lead to uncomfortable and/or unsafe driving behavior.

A common solution to overcome this reduction in performance caused by the gap dividing a two-part waveguide, is to use a two-part gap-waveguide. A gap-waveguide includes artificial magnetic conductors along the length of the waveguide channel surfaces, which enforce an EM boundary between the two parts, which crosses the gap and effectively prevents (most or all) leakage. For example, artificial magnetic conductors may include a periodic distribution of pins protruding from a planar surface of one of the metal parts and with care not to contact a planar surface of the other plate. The pins, when arranged near the energy path, behave like artificial magnetic conductors creating an open-circuit (e.g., not electrically conductive) boundary for the energy path contained between opposing metal surfaces, which are electrically conductive. Manufacturing artificial magnetic conductors as pins or other similar small features is difficult and produces a less robust component (e.g., pins may fail to release from a tool, pins can bend and/or break). If the pins are not precisely sized and arranged to prevent contact with the other plate, the open-circuit boundary provided by the artificial magnetic conductors is eliminated and the energy path disabled. In some cases, the energy path is not necessarily disabled but causes the characteristics and dimensions of the energy path to change, which can affect performance (e.g., propagation speed associated with antenna array). For example, some instances of pin-gap two-part waveguides may create contact and touch across the gap. When the gap between the pins is small enough or providing contact, the gap effectively behaves like a metal wall.

In contrast, this document describes a production-tolerant multi-part antenna system for achieving accurate dimensions of an energy path through a waveguide channel, despite the channel having inaccurate (e.g., too large, asymmetric) physical dimensions. The example antenna system may be cheaper to manufacture, more robust, and/or more reliable at achieving high levels of radar performance. For example, rather than use periodic pins designed not to touch both plates to maintain an artificial open-circuit boundary along the length of an energy path, in some examples, one or both metal surfaces include long ridges of continuously varying heights. At least one of the two structures may be a metal injection molded metal part to achieve precise ridge structures formed through metal injection molding techniques. Both parts may be arranged adjacent to a separation plane (e.g., a gap) between them. The size and shape of the metal structures (e.g., rounded/irregular corners, larger than ninety degree draft angles associated with vertical sides relative planar surface) may enable ease of manufacturing using metal-injection molding. Their shapes may cure irregularities in physical channel dimensions to enable an EM energy path with a sufficient a-dimension and/or b-dimension, which is accurately tuned and contained by the channel, despite physical irregularities, asymmetric parts, or other issues with the physical dimensions of the channel that allow other unwanted EM energy on the path.

These ridges are referred throughout as surface features, which shape and contour one or both planar surfaces of two metal structures. These example ridges, with their varying height, are larger in size and therefore more robust and easier to manufacture than pins or other artificial magnetic conductor structures. The surface features may have a variable height along a length of the energy path to not ensure an open circuit (electromagnetically conductive boundary) is preserved within the channel with portions of the ridges that do not contact both plates. The variable height maintains the EM boundary despite short circuit (electric conductor path) points at contact regions where the ridges contact both plates. With the example surface features described herein, risk of failure in the energy path due to electrical contacts between a surface feature and an opposing plate is reduced. The ridges or surface features are shaped and sized to compensate for unaligned upper and lower channel structures, while also controlling leakage and maintaining the desired EM isolation through the path (e.g., an EM boundary).

For example, two metal structures with planar surfaces are arranged about a separation plane. The planar surfaces are contoured to shape, respectively, an upper channel section and a complementary, lower channel section from an opposite side of the separation plane. Surface features on one or both planar surfaces are shaped to provide physical dimensions (e.g., length, width, and height) for a channel to be formed between the upper and lower channel sections. At least one of the surface features is shaped to compensate one or more of the physical dimensions for achieving a different set of path dimensions for enabling an EM energy path about the separation plane, which is tuned to a desired wavelength or frequency of EM energy. The EM energy path along the length of the channel is sized and shaped differently than the physical dimensions of the channel; for example, physical dimensions of the channel may be larger, irregularly shaped, or contoured for allowing undesired wavelengths or frequencies of EM energy through the channel. However, when arranged about the separation plane, the two structures configure upper and lower channel sections formed between them to compensate for deficiencies in the physical dimensions of the channel. Isolation for the desired EM energy is improved between the upper and lower channel sections; this compensation of the physical dimensions enables the two structures to achieve an EM energy path through otherwise deficient physical dimensions of the channel.

Achieving accurate path dimensions for an energy path this way can overcome various manufacturing problems arising from producing other two-part waveguide designs. Examples of multi-part antenna systems described herein may reduce cost and/or complexity in producing metal antenna components at mass scale (e.g., a production output to support demand for large sectors of entire industries). Path dimensions for an EM energy path are achieved, despite a waveguide channel having inaccurate or irregular physical dimensions. With planar surfaces and surface features shaped to compensate for misalignments and/or physical limitations of a two-part channel formed between two planar surfaces, many manufacturing problems due to misshaped and/or misaligned parts may be resolved. Antenna systems that are designed based on the described techniques reduce manufacturing tolerances and provide a simple and lower cost solution for manufacturing large volumes of two-part metal antenna parts.

This and other examples of a production-tolerant multi-part antenna system are just some examples of how the techniques described herein may be applied to improve performance of antenna systems. This document describes other examples and implementations, which can be combined in different ways for a particular application.

Example Environment

FIG. 1 illustrates an example environment 100 for a production-tolerant multi-part antenna system, in accordance with this disclosure. The example environment 100 contains a vehicle 102 equipped with a radar system 104, which is disposed within, on, or throughout the vehicle 102. Although illustrated as a car, the vehicle 102 can represent other types of motorized vehicles (e.g., a motorcycle, a bus, a tractor, a semi-trailer truck, construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers can mount the radar system 104 to any moving platform, including moving machinery or robotic equipment. In other implementations, other devices (e.g., desktop computers, tablets, laptops, televisions, computing watches, smartphones, gaming systems) may incorporate the radar system 104 with the waveguides 106 described herein (e.g., as part of an immersive radar-based user interface).

The radar system 104 can be part of the vehicle 102. The vehicle 102 can also include at least one automotive system that relies on radar data output from the radar system 104. Automotive systems can include an advanced driver assistance system (ADAS), or separate systems for providing driver-assistance, autonomous-vehicle control (e.g., handsfree driving), and/or semi-autonomous-controls (e.g., dynamic or adaptive cruise control). The radar system 104 can include an interface to these automotive systems, and output radar data generated by the radar system 104 via the interface. The radar system 104 determines signals based on EM energy (e.g., radar energy) received from the environment.

In the example environment 100, the radar system 104 can detect and track the object 108 by transmitting one or more radar signals and further by receiving reflections of the radar signals off the object 108. Radar signals are examples of EM signals transmitted and received by the radar system 104 using an antenna or antenna system. The radar system 104 includes an antenna system having one or more waveguides 106, which in this example are labeled as waveguides 106-1 and 106-2. The radar system 104 antenna may include only one of the waveguides 106, or both of the waveguides 106 (as shown). For example, with both of the waveguides 106, each may define a different portions of a common energy path, and in other cases, each of the waveguides 106 defines a different (e.g., separate) energy path.

The waveguides 106 provide an energy path for directing EM energy of EM signals being transmitted or received by the radar system 104. The radar system 104 includes a signal processor (e.g., MMIC) (not shown), which interfaces with the waveguides 106 to interpret EM signals from the EM energy obtained in response to a corresponding transmission. The radar system 104 may operate by transmitting and receiving EM signals in a frequency range of between 100 and 400 gigahertz (GHz), a frequency range of between 4 and 100 GHz, or between a frequency range of approximately 70 and 80 GHz. The desired wavelength or frequency of the radar signals can depend on the radar purpose (e.g., near range detection, far range detection) with an antenna pattern covering a range of angles in azimuth or elevation relative a direction of travel of the vehicle 102.

The radar system 104 may generate radar data (e.g., a data cube, detection lists) indicating a distance, a range, an angle, and/or a velocity of one or more objects 108 detected in a field of view 110. Generally, the automotive systems use radar data provided by the radar system 104 to perform a function. An ADAS can provide blind-spot monitoring and generate an alert indicating a potential collision with the object 108 detected by the radar system 104. In this case, the radar data from the radar system 104 indicates when it is safe or unsafe to drive the vehicle 102 in a particular direction. Autonomous or semi-autonomous driving systems may output collision alarms to alert drivers based on information obtained with the radar 104. For example, if a collision remains imminent, the ADAS can further control movement of the vehicle 102 to adjust speed, change direction, cause evasive maneuvers and/or emergency braking to prevent a collision between the vehicle 102 and the object 108.

Although not shown, the radar system 104 uses the waveguides 106 to enable an EM energy path between a radar transceiver (not illustrated) and at least one antenna element (not illustrated) on opposite ends of the energy paths through the waveguides 106. The transceiver can include a single component, or multiple components for emitting and receiving EM signals that reflect from the environment 100. For example, a transmitter and a receiver can be incorporated together on the same integrated circuit (e.g., a transceiver integrated circuit) or separately on different integrated circuits or chips.

The radar system 104 also includes one or more processors (not illustrated) and computer-readable storage media (CRM) (not illustrated). The processor can be a microprocessor or a system-on-chip. The processor executes instructions stored within the CRM. As an example, the processor can control the operation of the transceiver. The processor may be a signal processor configured to process EM energy received by the waveguides 106 to determine reflections to the object, which over time can indicate the location and/or movement of the object 108 relative to the radar system 104 and the vehicle 102. The processor can also generate radar data for the automotive systems. For example, the processor can control, based on processed EM energy from the waveguides 106, an autonomous or semi-autonomous driving system of the vehicle 102.

The waveguides 106 are shaped to contain an energy path between two metal plate structures. Each of the waveguides 106 includes two metal structures (e.g., an upper structure and a lower structure) that can include other solid materials, including wood, carbon fiber, fiber glass, plastic, or a combination thereof with conductive surfaces. The waveguides 106 can also include or be a portion of a printed circuit board (PCB). Using metal injection molded metal parts to form the upper and lower structures as two separate pieces may be a less complex or affordable way to achieve precise energy path dimensions, despite any of the individual pieces being out of tolerance in size or shape. The waveguides 106 are robust designs that allow easier manufacturing with being able to compensate for deviations in their relative alignment and/or their shapes.

Each of the waveguides 106 has surface features on at least one planar surface of the metal plate structures. The surface features are not labeled for simplicity of the drawings; however, they are described in detail below. In the design of the waveguide 106-1, the first planar surface (e.g., lower planar surface) includes at least some of the surface features and the second planar surface (e.g., upper planar surface) includes any remainder of the surface features. A different design is shown in the waveguide 106-2, which includes a first planar surface (e.g., an upper planar surface) that includes none of the surface features and the second planar surface (e.g., lower planar surface), which includes all of the surface features.

Each of the surface features contour the planar surface of a respective metal plate to compensate physical dimensions of a channel 114-1, 114-2 formed between the two metal plates. The surface features enable on an energy path following a Z-axis through the channel 114-1, 114-2, such that the waveguides 106 have an a-dimension 112-1 and a b-dimension 112-2, which are illustrated in dashed line contained by the physical dimensions of either of the channels 114-1, 114-2. The waveguides 106 are split along a separation plane aligned to the b-dimension 112-1 and the a-dimension 112-2, which is normal to a Z-axis aligned to the direction of energy through each of the dimensions 112-1, 112-2. The surface features overcome production variation in complementary parts and/or control leakage at the gap between them; this configures portions of the surface features or metal plates to enforce artificial magnetic boundaries through the channel for a tuned EM energy path that is sized different than the physical dimensions of the channels 114-1, 114-2.

The waveguides 106 may include an interface to the energy path for an antenna and/or MMIC coupled to either end or other opening into the channels 114-1, 114-2. Two structures of the waveguides 106 provide interfaces to the energy paths for directing the EM energy between a signal processor and at least one antenna element. The EM energy transfer enables the MMIC or other signal processor to transmit or receive EM signals via the antenna elements by channeling the EM energy on the energy path inside the channels 114-1, 114-2.

Example Antenna Systems

Figures 1, 2:
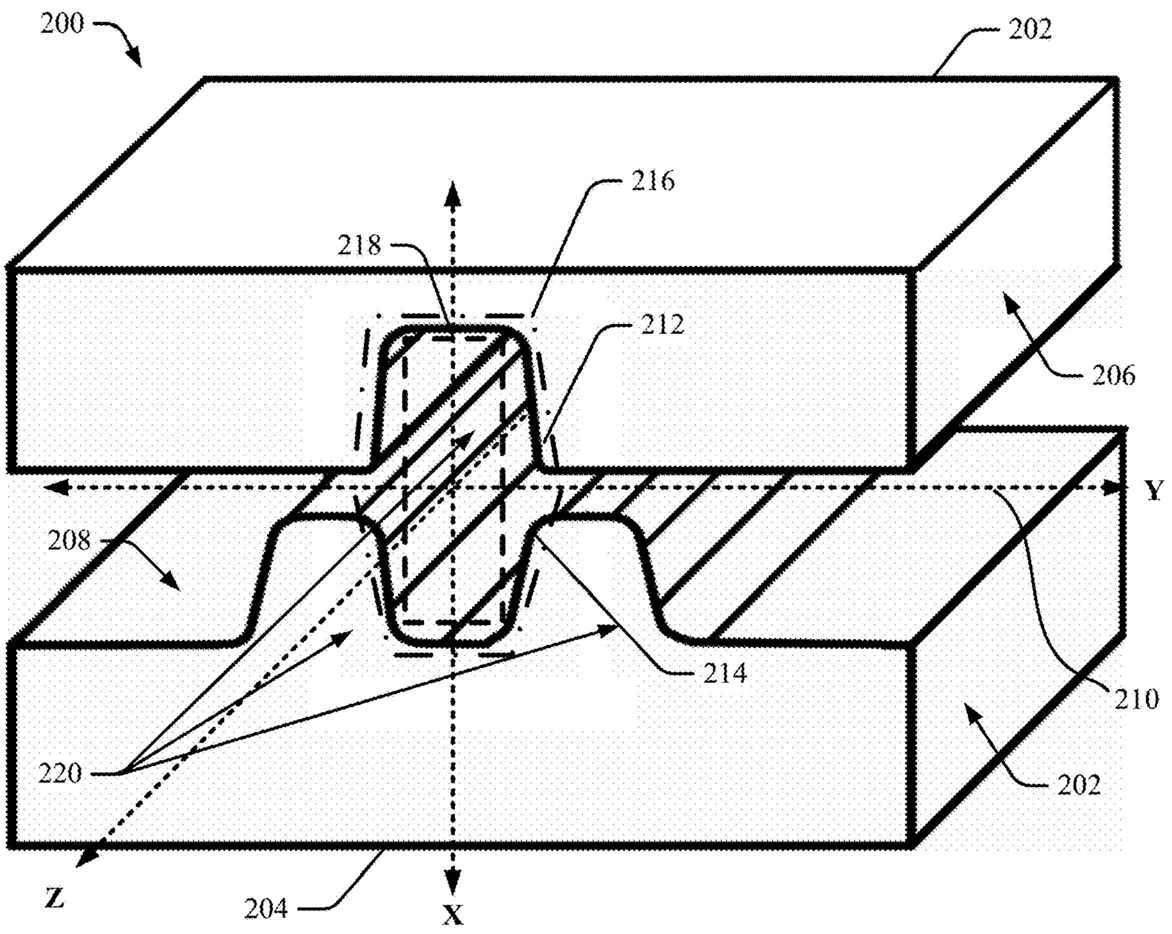
Figure 2:
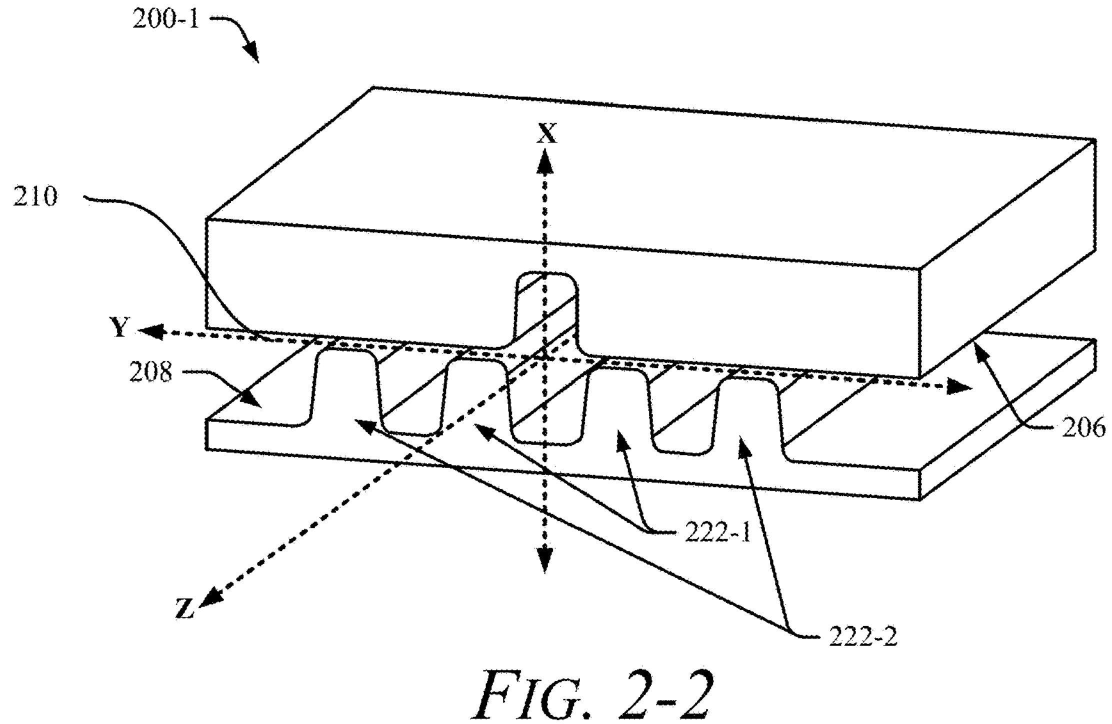
Figures 2, 3:
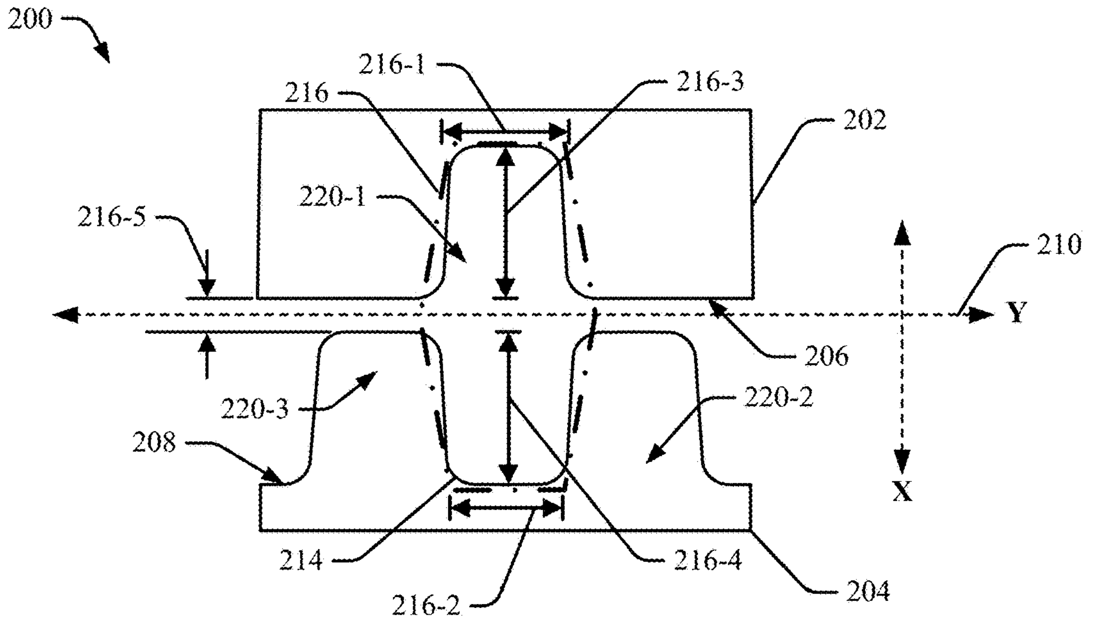
Figures 2, 3, 4:
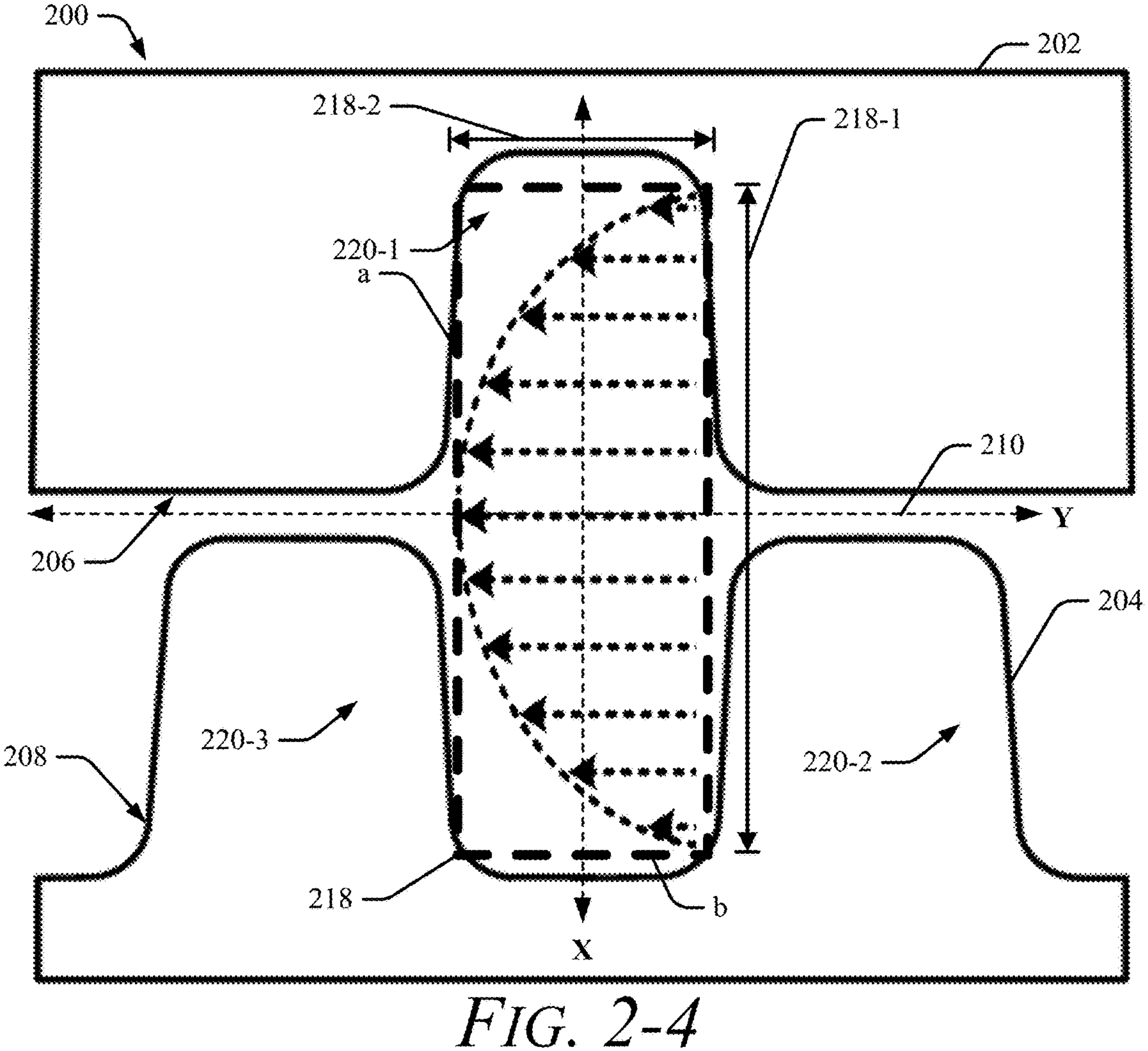

FIGS. 2-1 to 2-7 illustrate example views and concepts related to an example production-tolerant multi-part antenna system, including further details and designs related to the waveguide 106-1. FIGS. 3-1 to 3-4 illustrate example views and concepts related to another example production-tolerant multi-part antenna system, including further details and designs related to the waveguide 106-2.

Each of FIGS. 2-1 to 2-7, and 3-1 to 3-4 is described below in context of FIG. 1 as being part of the radar system 104 on the vehicle 102 that is operating in the environment 100. The features of the multi-part antenna systems described in relation to these example waveguides can be combined to form various designs that utilize different types of surface features. The surface features can be customized with specific sizes and shapes set to achieve precise path dimensions for enabling energy paths, despite irregularities or gaps in physical dimensions of complementary sections of channels that are formed between the two metal structures.

Turning first to FIG. 2-1, illustrated is an isometric view of a waveguide 200, which is a detailed example of the waveguide 106-1. The waveguide 200 represents a portion of an antenna system that includes two structures, an upper structure 202 and a lower structure 204. Each of the structures 202 and 204 includes a planar surface arranged on opposite sides of a separation plane 210. The upper structure 202 includes a first planar surface 206 arranged on one side of the separation plane 210, which is defined on an YZ-plane. A second planar surfaces 208 on the lower structure 204 is arranged on an opposite side of the separation plane 210 such that the first and second planar surfaces 206 and 206 are arranged in parallel about separation plane to achieve a consistent gap or separation along a vertical axis (e.g., X-axis) defined normal to the separation plane 210.

The first planar surface 206 is contoured to shape an upper channel section 212 that is adjacent to the separation plane 210. The second planar surface 208 is contoured to shape a lower channel section 214 to complement the upper channel section 212 from an opposite side of the separation plane 210 as the first planar surface 206. When arranged about the separation plane 210, at least one of the first and second planar surfaces 206 and 208 includes one or more surface features 220, which combine about the separation plane 210 to shape the upper and lower channel sections 212 and 214 and define physical dimensions 216 for an internal channel shape.

The physical dimensions 216 are defined about a length of the channel along the Z-axis, which is normal to the XY-plane. The physical dimensions 216 achieved between the two structures 202 and 204 provide a channel width and a channel height between them. The channel width and the channel height are each relative to a channel cross section (e.g., on a YZ-plane that is perpendicular to the separation plane 210). By themselves, the physical dimensions 216 are inadequate for tuning an energy path for isolating a particular frequency or wavelength of EM energy for propagation between the two structures 202 and 204.

To tune the energy path for the desired EM energy, at least one of the surface features 220 on the first planar surface 206 or the second planar surface 208 are specially shaped to compensate the physical dimensions 216 for enabling a correct-sized EM energy path between the planar surfaces 208 and 206. The path dimensions caused by the planar surface features 220 configure the physical dimensions 216 to enable a different size and/or shaped energy path between the planar surfaces 208 and 206, than provided by the physical dimensions 216.

For example, two of the surface features 220 may be a pair of ridge structures shaped on the planar surface 208 to provide the physical dimensions 216. However, intentional contours and sizing of the surface features 220 electromagnetically compensates the physical dimensions 216 to enable an EM energy path to be EM-bounded by path dimensions 218, which are not constrained by the physical dimensions 216. Surface features 220 are shaped to allow potential surface waves to have a less desirable path for leakage, thus improving performance. The path dimensions 218 are set to tune the EM energy path to propagate a desired wavelength or frequency of EM energy that cannot be isolated (or at least not to the same degree of accuracy) as the physical dimensions 216. The path dimensions 218 define EM boundaries and may be referred to as EM boundaries 218 or simply boundaries 218.

As explained below in greater detail, the path dimensions 218 enforce an a-dimension or b-dimension EM boundary for the energy path, which are less than at least one of (e.g., the channel width or the channel height) the physical dimensions 216 to improve performance by controlling leakage from the path. For example, the surface features 220 are shaped to form conductive surfaces within the physical dimensions 216 of the channel and enforce EM boundaries due to their ridge contours that follow the length of the channel, and trap and/or leak, from a gap about the separation plane 210, unwanted EM energy to exit from the channel. There may be some desired EM energy leakage, but this EM leakage (if any) is an order of magnitude less than the amount of EM energy leakage that comes from using other waveguide designs, which do not use surface features (e.g., the surface features 220) sized and shaped as described herein for both overcoming production issues and/or variations in the physical dimensions 216. The surface features 220 care configured to control leakage from the EM boundaries defined by the path dimensions 218 to improve isolation and overall performance.

FIG. 2-2 illustrates an isometric view of a waveguide 200-1, which is another variation of the waveguide 106-1 and/or 200. The waveguide 200-1 and the waveguide 200 each include at least one pair of ridge structures shaped on the planar surface 208 to provide the physical dimensions 216. However, the waveguide 200-1 includes an additional pairs of ridge structures. The two pairs of ridge structures are shaped on the planar surface 208 similar to the surface features 220 in the waveguide 200, but with improved channel isolation. The first pair includes a pair of ridge structures 222-1 provide the channel width and the channel height (e.g., similar to the ridge structures 220 on the planar surface 208 of the waveguide 200). A second pair of ridge structures 222-2 are shaped by the surface features on the planar surface 208. The ridge structures 222-2 are formed to be on the planar surface 208, outside the ridge structures 222-1, to provide a region between the two pairs of ridge structures 222-1 and 222-2 for undesired energy that leaks from the energy path to be trapped, and eventually dissipated from locations between the planar surfaces 206 and 208, which are outside of the channel. The undesired energy is trapped between a first ridge structure from the first pair 222-1 and a second ridge structure from the second pair 222-2 that is adjacent to the first ridge structure.

FIGS. 2-3 through 2-7 illustrates detailed cross sectional views of the waveguide 200, to provide further details of ways to compensate the physical dimensions 216 formed by shapes of the surface features 220 when arranged about the separation plane 210. An energy path is enabled through the waveguide 200, irrespective of a gap or separation between the structures 202 and 204 (e.g., along the X-axis, normal to the separation plane 210) due to shaping and sizing of the surface features 220.

FIG. 2-3 illustrates that on the planar surface 206 of the first structure 202, one of the surface features 220 provides an upper width 216-1 and a partial height 216-3, which define the physical dimensions 216 for an upper section of the channel. The upper width 216-1 defines a conductive region of the planar surface 206 shaped to be a conductive ceiling, above and parallel to the separation plane 210, for the length of the channel. The partial height 216-3 defines a conductive region of the planar surface 206 that shapes partial conductive walls to extend from both sides of the conductive ceiling and towards the separation plane 210 for the length of the channel. On the planar surface 208 of the second structure 204, two of the surface features 220 are arranged apart to define a lower width 216-2 and a partial height 216-4, which define the physical dimensions 216 for a lower section of the channel to complement the upper section. The upper section of the channel and the lower section of the channel may be mirror opposite shaped structures that restrict an EM energy path to have EM boundaries defined by the path dimensions 218, even though the physical dimensions 216 are otherwise inadequate for tuning the channel to the desired EM isolation.

The partial heights 216-3 and 216-4 may be approximately the same size, which is greater than the size of the upper and lower widths 216-1 and 216-2 (e.g., between one and two millimeters). The total height of the channel between the upper width 216-1 and the lower width 216-2 includes a combination of the partial height 216-3, the partial height 216-4, and a separation distance 216-5 (e.g., zero or greater) about the separation plane 210. The upper width 216-1 and the lower width 216-2 may be approximately the same (e.g., approximately one millimeter); however, a larger maximum width of the channel occurs about the separation plane 210, between the upper and lower sections of the channel.

The surface features 220 are sized and shaped to contain leaking waves outside of the energy path to preserve a-dimension and b-dimension boundaries that are different than the physical dimensions 216 of the channel. The surface features 220 overcome asymmetries or irregularities between complementary sections of the channel. The surface features 220 compensate the physical dimensions 216 to force EM boundaries the path dimensions 218 needed to contain propagation of the desired EM energy between the two structures 202 and 204.

For example, the maximum width of the channel is caused by the surface features 220 being shaped with large draft angles (e.g., greater than ninety degrees away from the vertical X-axis shown in FIG. 2-3) for the portions of the planar surfaces 206 and 208, which define the upper and lower partial walls. The large draft angles shape the planar surfaces 206 and 208 to provide a wider opening to the channel near the separation plane 210 than provided by the upper width 216-1 and the lower width 216-2. This eases manufacturability of the two structures 202 and 204 when using metal-injection molding techniques to form each as separate individual metal molded parts, including mold creation or to facilitate removal from the mold. Large draft angles beyond ninety degrees can facilitate removal of the metal molded parts from their respective molds, making overall production less complex and cheaper. However, without compensation of the varying width in the physical dimensions 216, the channel (e.g., with non-vertical walls) is not accurately tuned for isolating the desired EM energy.

To compensate the physical dimensions 216, the surface features 220 may be filleted (e.g., by the shape of the metal-injection mold) to provide rounded corner transitions from the portions of the planar surfaces 206 and 208 form the upper width 216-1 and the lower width 216-2. Not only do the filleted, rounded, or otherwise contoured corners in the upper and lower partial walls achieve the improved draft angles for easier metal injection molding, but design elements of the surface feature 220 enforce EM boundaries along the channel by controlling leakage and allowing unwanted EM energy to exit the channel. The surface features 220 have fillets and draft angles not only to improve manufacturing, but further to provide the correct path dimensions 218 needed to for propagating the desired EM energy.

As explained further with reference to the additional drawings, through careful shaping of the surface features 220, the physical dimensions 216 are therefore compensated to correctly size an energy path with a-dimensions and b-dimensions, within the physical dimensions 216 of the channel. For example, FIG. 2-4 illustrates how the surface features 220-1, 220-2, and 220-3 enforce EM boundaries having correct dimensions 218-1 and 218-2 for the energy path to be tuned to a desired wavelength or frequency of EM energy propagation. The dimensions 218 for the energy path produced by the two structures 202 and 204 define the a and b side artificial magnetic boundaries, which enable a desired wavelength or frequency of EM energy to propagate through the dimensions 218 even if the physical dimensions 216 of the channel are imperfect.

One boundary 218-1 is shown as defining opposite sides of an a-dimension for a rectangular shaped (e.g., on the XZ-plane) energy path, and the boundary 218-2 defines the other two sides of the energy path along a b-dimension of the energy path. The boundaries 218-1 and 218-2 cause the a-dimension or the b-dimension to encompasses portions of the surface features 220-2 and 220-3, which are within the physical dimensions 216 of the channel section 212. These EM boundaries 218-1 and 218-2 may include the maximum width or height of the channel, to include portions of the two structures 202 and 204 and/or the surface features 220 irrespective of whether they are used for structural support. Similar to using pins or other two-part waveguide designs, contact may occur from the surface features 220 allowed to extend between the two structures 202 and 204. However, the surface features 220 are shaped to be robust and enable the EM energy path whether contact is there or not. The surface features 220 mitigate leakage, so despite the contact, the EM energy path is maintained.

Energy can propagate in a direction normal to the XZ-plane, without leaking outside the boundaries 218-1 and 281-2 because of a shape of surface features 220-1, 220-2, and 220-3, which provide isolation in addition to sometimes also providing structural support the energy path. Explained below with reference to FIGS. 2-5, 2-6, and 2-7, precisely shaping the surface features 220 can achieve isolation for a precisely tuned energy path that allows undesired EM energy to leak into traps that are in regions located outside the surface features 220. Traps may be formed when the two metal structures are not precisely aligned or misshaped about the separation plane 210 to cause irregularity in the physical dimensions 216.

For example, FIG. 2-5 shows a waveguide 200-1, which is an example of the waveguide 200. As shown in an exploded view of the waveguide 200-1, a misalignment between the two structures 202 and 204 occurs at an important point of symmetry (e.g., between the planar surfaces 206 and 208, relative the separation plane 210 and the X-axis normal to the separation plane 210). The misalignment results in an irregular channel size defined by inconsistent dimensions that may be asymmetrical (e.g., due to poor manufacturing, mismatched parts) about the separation plane 210. The physical dimensions 216 between the upper channel section 212 and the lower channel section 214 are partially defined by the surface features 220. The surface features 220-3 and 220-2 represent an example pair of ridge structures, shaped to vary the channel height 216-4 of the waveguide 200-1 on both sides of the channel width 216-2. This allows undesired energy to leak from gaps (e.g., at the separation distance 216-5) between the ridge structures 220-2 and 220-3 on the planar surface 208 and the planar surface 206. The surface feature 220-1 is opposite the separation plane and unaligned relative an axis (e.g., the X-axis) that is normal to the separation plane 210 with the surface features 220-2 and 220-3.

The surface features 220 enforce the boundaries 218-1 and 218-2 of the energy path to include regions between the two structures 202 and 204 (e.g., regions that support walls and surfaces of the physical dimensions 216), while further configuring the separation plane 210 between the two structure 202 and 204 to control energy leakage and isolate only the desired wavelength or frequency within the energy path. The arrangement of the two structure 202 and 204 relies on the size and contours of the surface features 220 to configure the planar surface 206 and the planar surface 208 as conductive surfaces defining an imperfect, hollow (e.g., air-filled) conductive channel. Despite the misalignment, contours in the surface features 220 configure their respective conductive surfaces to control EM leakage (e.g., prevent unwanted energy from entering or exiting) by trapping unwanted energy outside the physical dimensions 216, and outside the boundaries 218-2. The surface features 220 are shaped and sized to only allow the desired wavelength or frequency of EM energy to propagate between the boundaries 218-2 defined to pass through (e.g., in the Z-direction) the surface features 220.

The shapes and/or sizes (e.g., a ridge, a peak, a highest portion) of the surface features 220 may likewise prevent the desired EM energy from leaking from the boundaries 218-2, even if two of the surface features 220 have regions of asymmetry where unwanted EM energy may be allowed to enter from the separation plane 210. For example, the surface features 220-2 and 220-3 are shown in FIG. 2-5 with a feature width 224-1, and a feature height 224-2. The feature width 224-1 of the surface features 220-3 and 220-2 may be approximately the same size as the upper width 216-1 and the lower width and 216-2. The feature height 224-2 of the surface features 220-3 and 220-2 may be sized based on the desired wavelength of EM energy for the energy path. When an asymmetry exists (e.g., along the a-dimension of the energy path aligned to the boundary 218-2, as shown in the exploded view shown in FIG. 2-5), the feature height 224-2 defines roughly half of an entire a-dimension boundary, which is at least one half the desired wavelength. When arranged along the b-dimension of the energy path, the feature height 224-2 defines roughly half of an entire b-dimension boundary, which in total is less than the a-dimension (e.g., up to one half the desired wavelength). For example, the surface features 220-3 and 220-2 can have the same feature height 224-2 to complement the feature height 224-1 of the surface feature 220-1. In this example, the surface features 220-1, 220-2, and 220-3, are each set to divide the a-dimension through the boundary 281-2 to be roughly one half the a-dimension, or one quarter the desired wavelength, on both sides of the separation plane 210. Instead of EM energy being allowed to leak into or out of the channel due to the asymmetry, the feature height 224-2 is set to leak and/or prevent unwanted energy from the energy path such that only a desired EM energy is allowed to propagate between the boundaries 218-1 and 218-2. The boundaries 218-1 and 218-2 can be shaped to allow the desired EM energy to propagate up to but not beyond a top part, a middle, or a ridge of the surface feature 220.

In addition to correctly sizing the feature width 224-1 and the feature height 224-2 to define boundaries 218-1 and 218-2, and control energy leakage, in some cases, the shaping and sizing of the surface features 220 involves forming the surface features 220 to achieve specific draft angles and/or fillet sized shapes to further increase isolation performance, but also to improve manufacturability. FIGS. 2-6 and 2-7 show examples of surface features with designs to facilitate metal-injection molding and other metal working techniques for easing manufacturing or production tolerances in assembling the waveguide 200-1 from the two metal structures 202 and 204.

FIG. 2-6 shows a waveguide 200-2 with slight variation in the size and shapes of surface features used between the two structures. The waveguide 200-2 shows the surface features to have cross sections that contour at least part of the channel height using fillets 228-1 and 228-2 and non-vertical draft angles 230-1 and 230-2 to shape surfaces inside the physical dimensions 216 for ease of manufacturing from metal-injection molding the parts. A fillet rather than a chamfer or right-angle corner, when used alone or in combined with a non-vertical draft angle that widens the physical dimensions 216 near the separation plane where they meet, can reduce overall costs. Cheaper and/or more-effective molds can be used through these designs. Through shaping fillets and/or obtuse draft angles with the metal-injection molds, removal of the final metal-injection molded part is made easier, requiring little to finishing to achieve the final shape. The example antenna systems and waveguides are designed to provide high performance EM energy paths from very robust all-metal parts, which are less complex to manufacture due to their design being conducive for using metal-injection molding as opposed to metalized plastic injection molding or other expensive and/or more complex manufacturing techniques to produce individual waveguide parts.

Figures 2, 3, 4, 5:
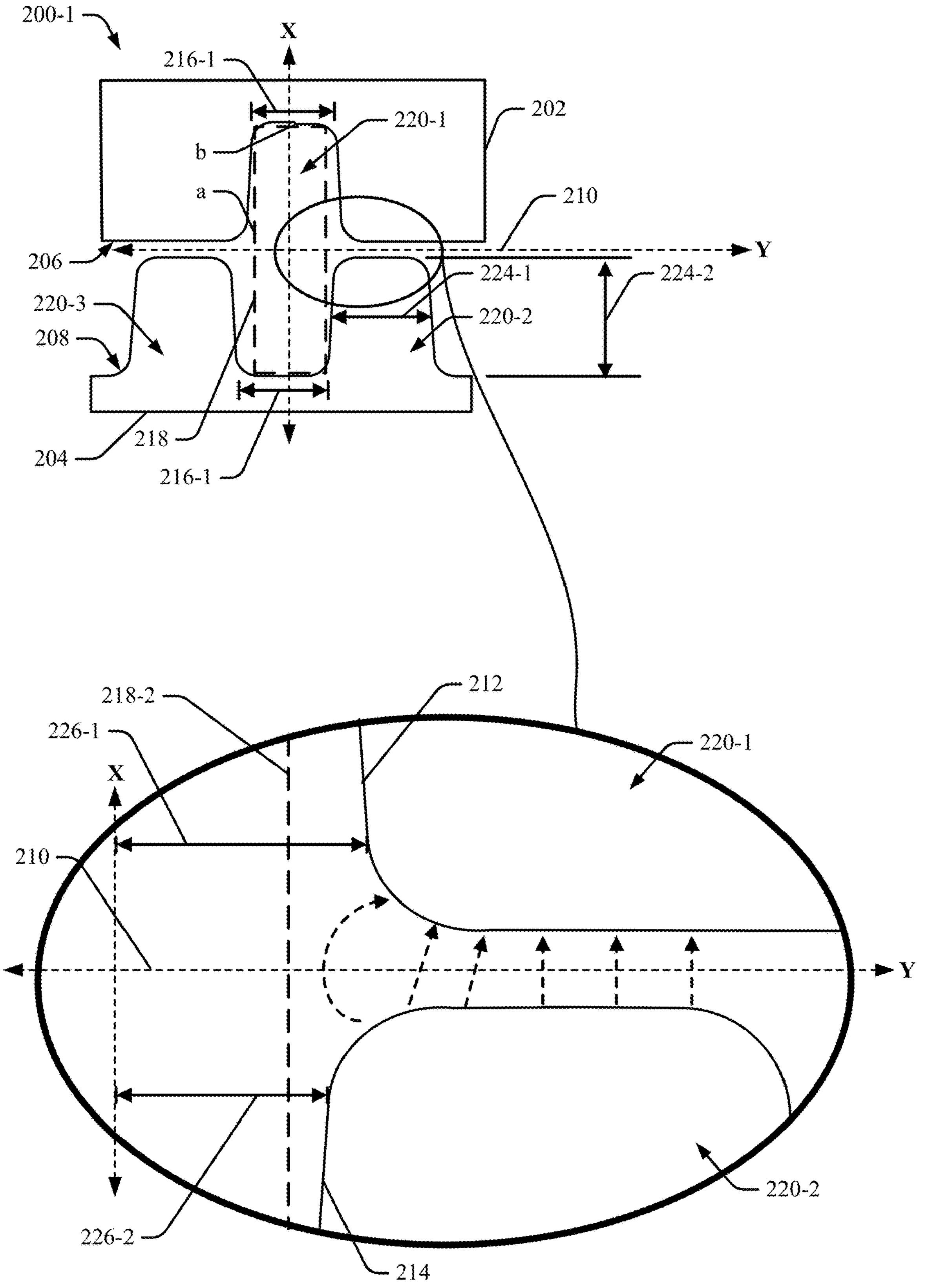
Figures 2, 3, 4, 5, 6:
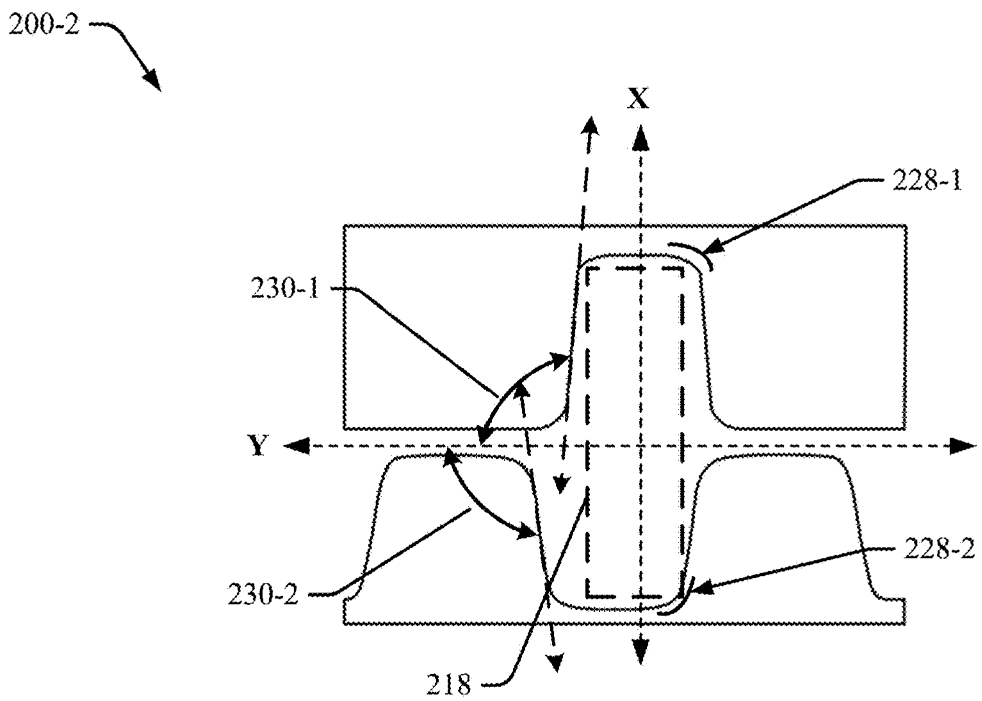
Figures 2, 3, 4, 5, 6, 7:
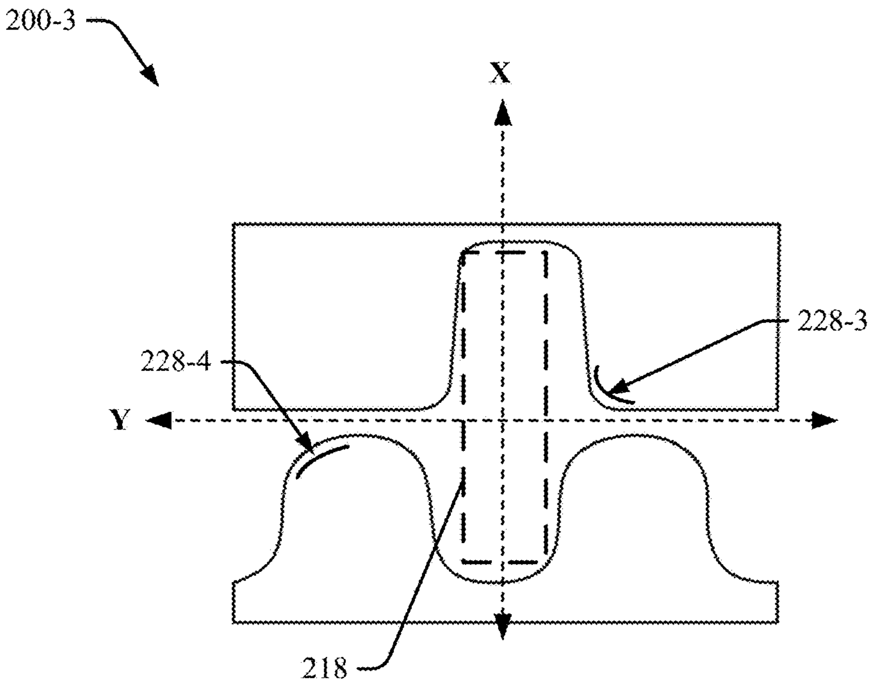
Figures 1, 3:
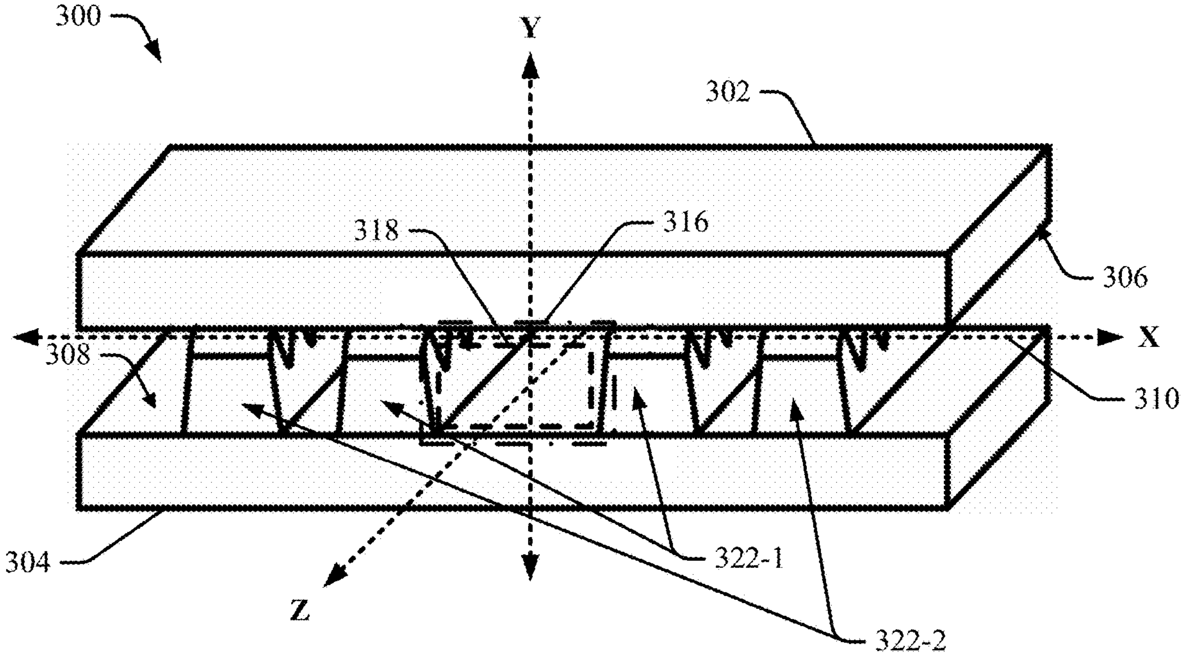
Figures 2, 3:
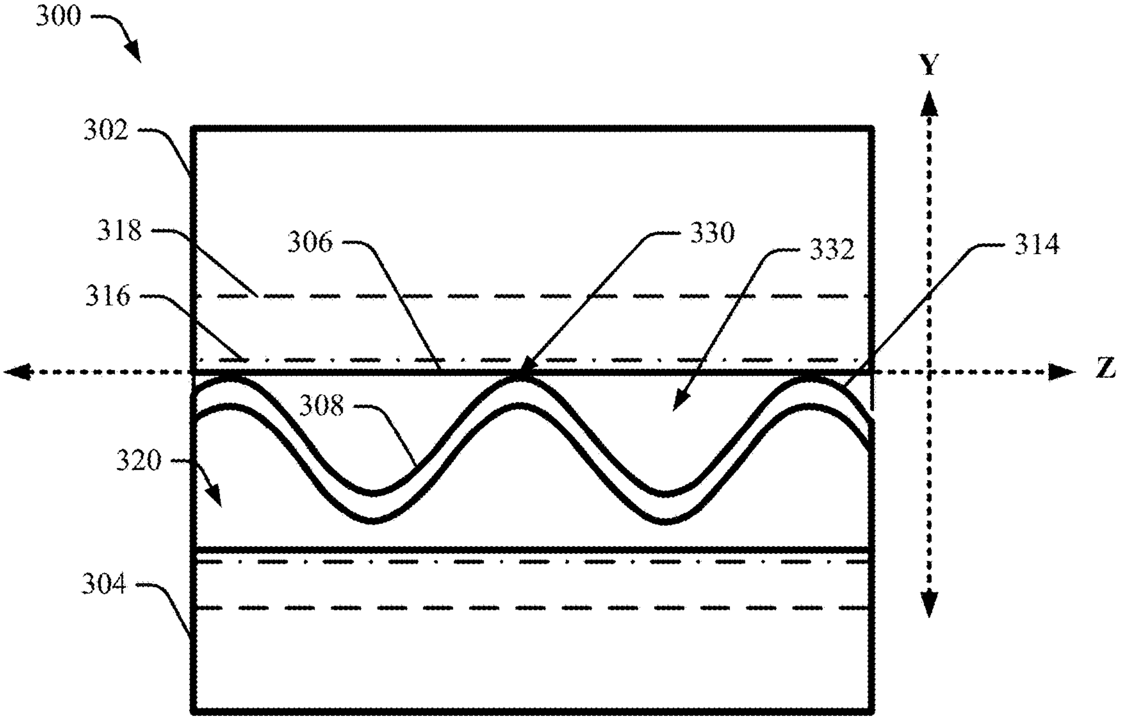
Figure 3:
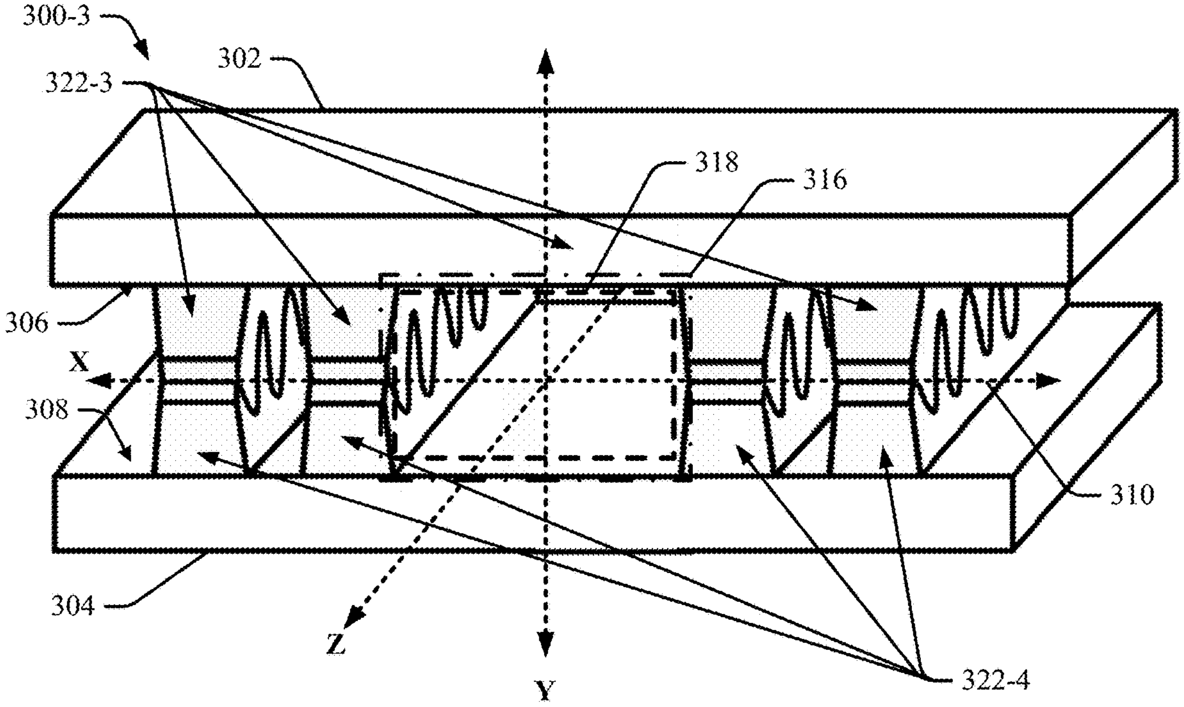
Figures 3, 4:
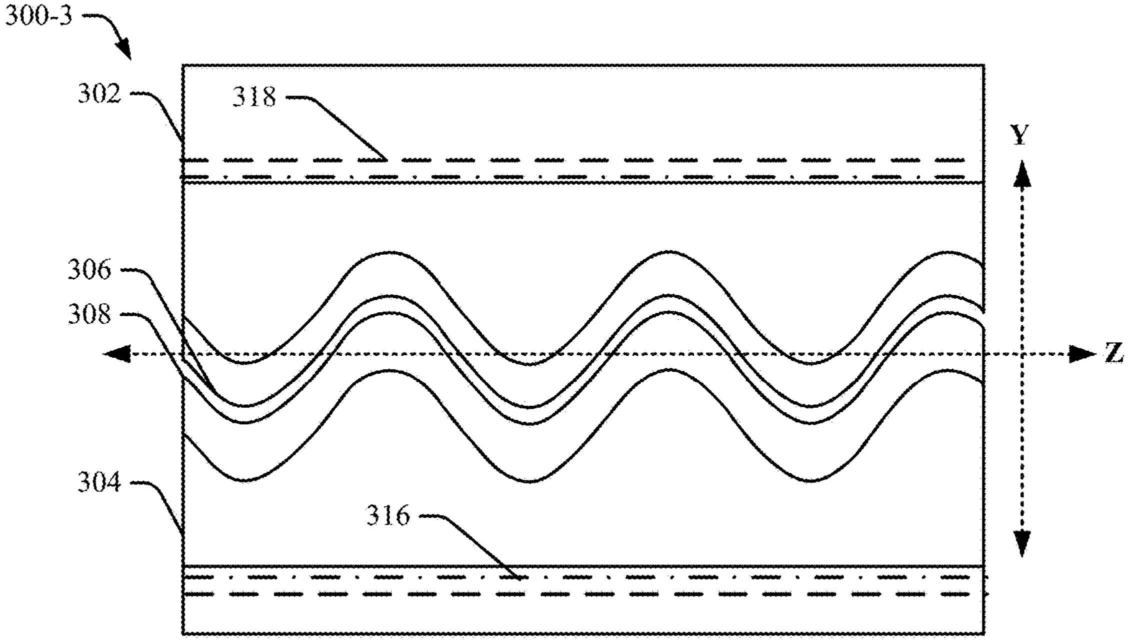
Figure 4:
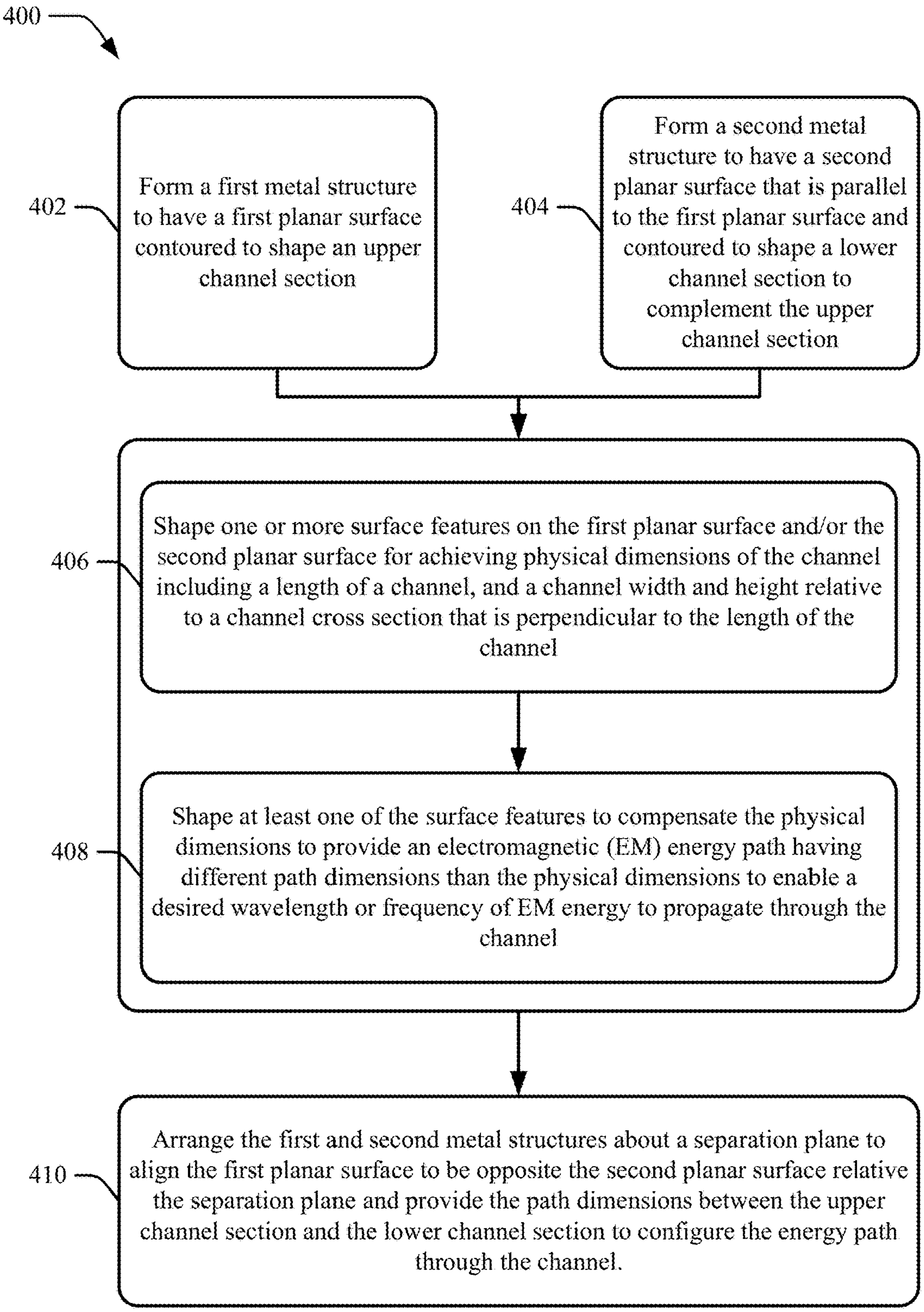

FIG. 2-7 shows a waveguide 200-3 with similar variations to the size and shapes of surface features used between the two structures as compared to the waveguides 200-1 and 200-2. The waveguide 200-3 shows the surface features to have cross sections that create EM energy traps near the separation plane. The waveguide 200-3 includes upper fillets 228-3 to shape the upper channel section 212 to contour at least part of the channel height. Lower fillets 228-4 shape the lower channel section 214 to further contour at least part of the channel height. As an example, a filet may be sized to have a one quarter millimeter radius when the feature width 224-1 is approximately one millimeter or more. Through careful sizing of opposing fillets 228-3 and 228-4 (e.g., near important symmetry points along the length of the channel as shown in FIG. 5, any undesired EM energy entering the hollow channel is trapped between the opposing fillets of the two structures 204. This forces the undesired energy to leak from the separation plane 210 and improve isolation.

Turning to FIG. 3-1, illustrated is an isometric view of a waveguide 300, which is a detailed example of the waveguide 106-2. The waveguide 300 represents a portion of an antenna system that includes two structures, an upper structure 302 and a lower structure 304. Each of the structures 302 and 304 includes a planar surface 306 or 308 arranged on opposite sides of a separation plane 310. The upper structure 302 includes the planar surface 306 arranged on one side of the separation plane 310, which is defined on an XZ-plane. The planar surfaces 208 on the lower structure 304 is arranged on an opposite side of the separation plane 310 such that the first and second planar surfaces 306 and 306 are arranged in parallel about the separation plane 310 to achieve a consistent gap or separation along a vertical axis (e.g., Y-axis) defined normal to the separation plane 310.

When arranged about the separation plane 310, at least one of the first and second planar surfaces 306 and 308 includes multiple surface features pairs 322, which combine about the separation plane 310 shape the physical dimensions 316 for an internal channel shape. The physical dimensions 316 are defined about a length of the channel along the Z-axis, which is normal to the XY-plane.

The surface features pairs 322 are all arranged on the planar surface 308 and include two pairs of ridge structures 322-1 and 322-1. More pairs may be used to improve isolation; fewer pairs can be used to reduce cost and achieve high performance. Each of the two surface feature pairs 322-1 and 322-2 includes pair of ridge structures shaped on a same planar surface to provide the channel width on either side of the separation plane and further to each provide complete walls that extend towards the separation plane and combine to provide the channel height. In the waveguide 300, the upper structure 302 includes a planar surface throughout the surface 306. This example shows how in some implementations there are benefits to only forming surface features on one structure.

To isolate the EM energy path to propagate a desired wavelength or frequency of EM energy, the ridge structures 322-1 vary the channel height along the length of the channel to allow undesired energy to leak from gaps between the ridge structures 322-1 and the planar surface 308. A larger feature height may cause contact between the upper and lower structures 302 and 304, which for other systems causes the channel to be inoperable; magnetic boundaries disrupted due to a resulting electrically-conductive boundary. However, the ridge structures 322-1 form gaps along the length of the channel by varying the channel height and cause the contact regions to be intermittent, and their overall effects reduced. The gaps are provided between the contacts to effectively preserve the EM boundaries despite the intermittent contact regions, to enforce the path dimensions 318. Further, because of the second pair of ridge structures 322-2 are arranged further from the channel than the first pair of ridge structures 322-1, any leaked undesired energy from the path dimensions 218 may be trapped between the two pairs of ridge structures 322. In this way, the unwanted energy can be contained outside the channel until it can leak further away from the channel, e.g., from gaps in the ridge structures 322-2.

FIG. 3-2 shows a detailed cross-section view of the waveguide 300. The cross section is along the YZ-plane that is normal to the separation plane 310 along the X-axis. From FIG. 3-2, a contour of a ridge structure or surface feature 320 is shown with a rounded crest formed on the surface 308. The surface feature 320 causes at least part of the channel dimensions 316 to have surfaces shaped with a repeating pattern in the planar surface 308, in a direction along the length of the channel (e.g., on the Z-axis). The surface 308 has contoured ridge that has a sinusoidal shaped repeating pattern to the channel height relative to the separation plane 310, which is on the planar surface 306. Other example patterns other more complex periodic or sinusoidal wave patterns, sawtooth wave patterns, square wave or pulse patterns, and the like. The repeating pattern is along the channel length to enforce EM boundaries of the path dimensions 318, despite intermittent contact regions 330. The contact regions 330 occur where the two structures 304 meet across the separation plane 310. At the contact regions 330, an electrically conductive boundary rather than an EM boundary exists. Gap regions 332 are further defined by the pattern in the varying height. The gap regions 332 maintain leakage control about the separation plane 310 by enforcing the EM boundaries where the contact regions 330 do not exist. That is, the surface features 320 are shaped with a varying height to achieve the gap regions 332 that preserve the EM boundaries in the absence of the contact regions 330.

FIGS. 3-3 and 3-4 illustrate isometric views of additional waveguide designs that utilize a combination of features from the waveguides 106-1 and 106-2. It should be understood that the features of the waveguides 106-1, 106-2, 200, 200-1, 200-2, 200-3, 300, 300-1, and/or 3002 can be combined to achieve a particular antenna design with multiple benefits. FIGS. 3-3 and 3-4 show, respectively, isometric, and cross sectional side views of a waveguide 300-3, which is another example of the waveguides described in the previous examples.

The upper structure 302 and the lower structure 304 are mirror opposite sections that are arranged about the separation plane to form path dimensions 318 that compensate the physical dimensions 316, with improved robustness and isolation. Each of the sections has a pattern of ridge structures 322-3 or 322-4. The ridge structures 322-3 provide a contoured crest with the same feature width 324-1 and feature height 324-2 as the contoured crest of the ridge structures 322-4. When aligned about the YZ-plane and placed near or in contact along the X-axis near the separation plane 310, the waveguide 300-3 provides channel isolation, in addition to a gap invariant waveguide design with internal structural support to achieve the path dimensions 318, regardless of a separation or gap size, and despite irregularities or limitations in the physical dimensions 316.

With a repeating pattern varying the channel height along the channel width, the ridge structures 322-3 and 322-4 compensate the physical dimensions 316 for a misalignment between complementary portions of the planar surfaces to preserve the EM boundaries between the planar surfaces 306 and 308.

Example Process

FIG. 4 illustrates an example process 400 of forming a high-tolerant multi-part antenna system, in accordance with techniques of this disclosure. The order in which operations or steps of the process are numbered as steps 402 through 410. The steps 402 to 410 are shown and/or described to be performed in an example order of operations, however, the process 400 can be performed in other ways including rearranging, combining, omitting, or performing additional steps without departing from the scope of this disclosure.

The process 400 can be used to manufacture an antenna system like the waveguides 106-1 and 106-2, or any other example antenna part, in accordance with the described techniques. This process may reduce complexity and cost of forming two-part metal waveguides.

At step 402, using metal injection molding, a first metal structure for an antenna system is formed to have a first planar surface contoured to shape an upper channel section. For example, metal-injection molding can be used form the metal structure 202 and/or the metal structure 302. Other more complex manufacturing techniques may be used; however, they may increase costs without improving performance.

At step 404, using metal injection molding, a second metal structure for the antenna system, the second metal structure formed to have a second planar surface that is parallel to the first planar surface and contoured to shape a lower channel section to complement the upper channel section from an opposite side of a separation plane defined between each metal structure. For example, metal-injection molding can be used form the metal structure 204 and/or the metal structure 304.

At step 406, as part of forming the first metal structure and the second metal structure from injection molding in steps 402 and 404, one or more surface features are shaped on at least one of the first planar surface or the second planar surface along a length of the channel for achieving the physical dimensions of the channel including a channel width and a channel height each relative to a channel cross section that is perpendicular to the separation plane between the upper channel section and the lower channel section. For example, metal injection molding the structures 202 and 204 form the surface features 220. Result of metal injection molding the structures 302 and 304 contour the respective surfaces to form the surface feature groups or pairs 322.

At step 408, in furtherance of the metal injection molding in each previous step, at least one of the surface features is shaped as part of the injection molding process to compensate the physical dimensions to provide an EM energy path having different path dimensions than the physical dimensions to enable a desired wavelength or frequency of EM energy to propagate through the channel. For example, forming the metal structures may include executing the above steps, in addition to including forming the parts to have draft angles associated with partial walls of the upper section or the lower section. These metal-injection molded shapes forming the partial walls may have draft angles that exceed ninety degrees relative to the separation plane 210 or 310 for enabling easier separation of the upper section or the lower section from a mold. In some cases, forming the metal structures may include forming channel corners of the upper section or the lower section that are fillet shaped to overcome asymmetries in the energy path that extend from the channel corners and across the separation plane 210 or 310.

At step 410, the first metal structure is arranged relative the second metal structure on opposite sides of the separation plane to align the first planar surface to be opposite the second planar surface relative the separation plane and provide physical dimensions of a channel formed between the upper channel section and the lower channel section. For example, for achieving an a-dimension or a b-dimension for the energy path that is located beyond at least one of the channel width or the channel height, the two structures 202 and 204, or 302 and 304 are arranged to be approximately aligned on opposite sides of the separation plane. However, their surface features 220 and 320 have shapes to allow for manufacturing tolerance in their alignment; their shapes can compensate deviations in the physical dimensions 316 to tune an energy path to be the proper size within the channel.

In addition, forming the antenna system may include configuring two structures may provide an interface to the energy path for a signal processor or an antenna element to transmit or receive EM signals inferred from the EM energy directed on the energy path. For example, the vehicle 102 may drive assisted or autonomously using radar based controls that rely on the example waveguides and antenna systems described herein to detect objects and drive safely.

Additional Examples

In the following section, some additional examples are provided.

Example 1

An antenna system comprising: two structures with parallel first and second planar surfaces arranged about a separation plane, a first planar surface being contoured to shape an upper channel section adjacent to the separation plane, a second planar surface being contoured to shape a lower channel section to complement the upper channel section from an opposite side of the separation plane as the first planar surface, at least one of the first and second planar surfaces includes one or more surface features to provide physical dimensions along a length of the channel, the physical dimensions include a channel width and a channel height between the upper channel section and the lower channel section, the channel width and the channel height each relative a channel cross section that is perpendicular to the separation plane, and at least one of the surface features being shaped to compensate the physical dimensions to provide an electromagnetic (EM) energy path having different path dimensions than the physical dimensions to enable a desired wavelength or frequency of EM energy to propagate through the channel.

Example 2

The antenna system of any preceding example, wherein the path dimensions achieve an a-dimension or b-dimension for the energy path that exceeds at least one of the channel width or the channel height.

Example 3

The antenna system of any preceding example, wherein the path dimensions of the energy path encompass portions of the surface features located partially within at least one pair of surface features for the length of the channel, the pair of surface features being separated on the first planar surface by the channel width and contoured to enable the energy path within the channel width and the channel height irrespective of a gap about the separation plane.

Example 4

The antenna system of any preceding example, wherein the surface features are shaped to form conductive surfaces within the physical dimensions of the channel, and enforce EM boundaries along the length of the channel irrespective of a gap about the separation plane, the surface features having shapes to allow unwanted energy to leak outside the conductive surfaces of the channel.

Example 5

The antenna system of any preceding example, wherein: the first planar surface includes at least some of the surface features and the second planar surface includes any remainder of the surface features; or the first planar surface includes none of the surface features and the second planar surface includes all of the surface features.

Example 6

The antenna system of any preceding example, wherein the surface features produce EM boundaries for the energy path to have a rectangular shape along the length of the channel with an a-dimension or b-dimension that is smaller than the physical dimensions of the channel.

Example 7

The antenna system of any preceding example, wherein the surface features include at least one pair of ridge structures shaped on the first planar surface to provide the physical dimensions.

Example 8

The antenna system of any preceding example, wherein the surface features include pairs of ridge structures shaped on the first planar surface, a first pair providing the channel width and the channel height, and a second pair shaped on the planar surface outside the first pair to provide a region for undesired energy to leak from the channel and be trapped between a first ridge structure from the first pair and a second ridge structure from the second pair.

Example 9

The antenna system of any preceding example, wherein the surface features include at least two pairs of ridge structures, each pair of ridge structures being shaped to provide the channel width on either side of the separation plane and further to each provide partial walls that extend towards the separation plane and combine to provide the channel height.

Example 10

The antenna system of any preceding example, wherein the ridge structures vary the channel height along the length of the channel to allow undesired energy to leak from gaps between the ridge structures and the second planar surface.

Example 11

The antenna system of any preceding example, wherein the ridge structures vary the channel height on both sides of the channel width to allow undesired energy to leak from gaps between the ridge structures and the second planar surface.

Example 12

The antenna system of any preceding example, wherein the surface features have cross sections that contour at least part of the channel height using a fillet and a non-vertical draft angle to shape surfaces inside the channel width.

Example 13

The antenna system of any preceding example, wherein the cross sections contour at least part of the channel height to shape a repeating pattern in the planar surfaces in a direction along the length of the channel, the repeating pattern including a sinusoidal wave, a sawtooth wave, or a square wave.

Example 14

The antenna system of any preceding example, wherein the repeating pattern is along the length of the channel to compensate the physical dimensions for short-circuit effects at periodic contacts between complementary portions of the planar surfaces by forming gaps between the periodic contacts to maintain the path dimensions.

Example 15

The antenna system of any preceding example, wherein at least one of the two structures comprises a metal injection molded metal part.

Example 16

The antenna system of any preceding example, wherein draft angles associated with partial walls of the upper section or the lower section are metal-injection molded shapes forming the partial walls with draft angles that exceed ninety degrees relative the separation plane for enabling easier separation of the upper section or the lower section from a mold.

Example 17

The antenna system of any preceding example, wherein channel corners of the upper section or the lower section are filleted to extend the energy path from the channel corners into regions of the surface features for achieving an a-dimension or a b-dimension for the energy path that is located inside at least one of the channel width or the channel height.

Example 18

The antenna system of any preceding example, wherein an a-dimension or a b-dimension of the energy path within the partial walls is aligned to an axis that is normal to the separation plane.

Example 19

The antenna system of any preceding example, wherein two structures provide an interface to the energy path for a signal processor or an antenna element to transmit or receive EM signals inferred from the EM energy directed on the energy path.

Example 20

A method comprising forming the antenna system of any preceding example.

Example 21

A method for manufacturing an antenna system, the method comprising: forming, using metal injection molding, a first metal structure for the antenna system, the first metal structure formed to have a first planar surface contoured to shape an upper channel section; forming, using metal injection molding, a second metal structure for the antenna system, the second metal structure formed to have a second planar surface that is parallel to the first planar surface and contoured to shape a lower channel section to complement the upper channel section from an opposite side of a separation plane defined between each metal structure; and arranging the first metal structure relative the second metal structure on opposite sides of the separation plane to align the first planar surface to be opposite the second planar surface relative the separation plane and provide physical dimensions of a channel formed between the upper channel section and the lower channel section, wherein forming at least one of the first structure or the second structure comprises: shaping one or more surface features on at least one of the first planar surface or the second planar surface along a length of the channel for achieving the physical dimensions of the channel including a channel width and a channel height each relative to a channel cross section that is perpendicular to the separation plane between the upper channel section and the lower channel section; and further shaping at least one of the surface features to compensate the physical dimensions to provide an electromagnetic (EM) energy path having different path dimensions than the physical dimensions to enable a desired wavelength or frequency of EM energy to propagate through the channel.

Example 22

A method comprising using the antenna system of any preceding example to transmit or receive EM signals.

Example 23

A system comprising a device configured to perform the method of any previous example to form or use the antenna system of any preceding example.

Example 24

A system comprising at least one processor configured to perform the method of any previous example to form or use the antenna system of any preceding example.

Example 25

A system comprising means for performing the method of any previous example to form or use the antenna system of any preceding example.

Example 26

A computer-readable storage media comprising instructions that, when executed, configure at least one processor to execute the method of any previous example to form or use the antenna system of any preceding example.

Example 27

The antenna system of any preceding example, wherein the antenna system is for a radar system.

Example 28

The system of any preceding example, wherein the antenna system is used for a vehicle radar system.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. An antenna system comprising:

a first structure with a first surface;

a second structure with a second surface, the second surface extending parallel with the first surface, wherein the first surface has planar potions and is contoured to provide an upper channel section of a channel, and wherein the second surface has planar portions and is contoured to provide a lower channel section of the channel to complement the upper channel section;

at least one of the first and second surfaces includes a plurality of surface features, the plurality of surface features including at least one pair of ridge structures defining physical dimensions of the channel along a length of the channel, the physical dimensions include a channel width and a channel height of a cross section of the channel, the cross section extending perpendicular to i) at least one of a top surface of the first structure and a bottom surface of the second structure, and ii) the length of the channel, and the at least one pair of ridge structures extending from the at least one of the first and second surfaces such that the second structure contacts the first structure via the at least one pair of ridge structures; and at least one of the plurality of surface features being shaped to compensate for the physical dimensions and provide an electromagnetic (EM) energy path having different path dimensions than the physical dimensions to enable a desired wavelength or frequency of EM energy to propagate through the channel.

2. The antenna system of claim 1, wherein the path dimensions achieve an a-dimension or b-dimension for the EM energy path that exceeds at least one of the channel width or the channel height.

3. The antenna system of claim 2, wherein the path dimensions of the EM energy path encompass portions of the plurality of surface features located partially within at least one pair of the plurality of surface features for the length of the channel, the pair of the plurality of surface features being separated on the first surface by the channel width and contoured to enable the EM energy path within the channel width and the channel height.

4. The antenna system of claim 1, wherein:

the plurality of surface features are shaped to form conductive surfaces within the physical dimensions of the channel and enforce EM boundaries along the length of the channel; and the plurality of surface features having shapes to allow unwanted energy to leak outside the conductive surfaces of the channel.

5. The antenna system of claim 1, wherein:

the first surface includes at least some of the plurality of surface features and the second surface includes any remainder of the plurality of surface features; or the first surface includes none of the plurality of surface features and the second surface includes all of the plurality of surface features.

6. The antenna system of claim 1, wherein the plurality of surface features produce EM boundaries for the EM energy path to have a rectangular shape along the length of the channel with an a-dimension or b-dimension that is smaller than the physical dimensions of the channel.

7. The antenna system of claim 1, wherein;

the at least one pair of ridge structures is shaped on the first surface to provide the physical dimensions;

the first surface comprises the plurality of surface features including pairs of ridge structures; and the pair of ridge structures including a first pair of ridge structures providing the channel width and the channel height and a second pair of ridge structures disposed outside the first pair of ridge structures to provide a region for undesired energy to leak from the channel and be trapped between the first pair of ridge structures and the second pair of ridge structures.

8. The antenna system of claim 1, wherein;

the at least one pair of ridge structures is shaped on the first surface to provide the physical dimensions; and the plurality of surface features include at least two pairs of ridge structures including the at least one pair of ridge structures, each of the pairs of ridge structures being shaped to provide the channel width and further to each provide partial walls that combine to provide the channel height.

9. The antenna system of claim 1, wherein:

the at least one pair of ridge structures is shaped on the first surface to provide the physical dimensions; and the at least one pair of ridge structures vary the channel height along the length of the channel to allow undesired energy to leak from gaps between the at least one pair of ridge structures and the second surface.

10. The antenna system of claim 1, wherein:

the at least one pair of ridge structures is shaped on the first surface to provide the physical dimensions; and the at least one pair of ridge structures vary the channel height on both sides of the channel to allow undesired energy to leak from gaps between the at least one pair of ridge structures and the second surface.

11. The antenna system of claim 1, wherein the plurality of surface features have cross sections that contour at least part of the channel height using a fillet and a non-vertical draft angle to shape surfaces inside the channel width.

12. The antenna system of claim 1, wherein;

the at least one pair of ridge structures is shaped on the first surface to provide the physical dimensions; and surfaces of the at least one pair of ridge structures are shaped to have a repeating pattern in a direction along the length of the channel, the repeating pattern including a sinusoidal wave, a sawtooth wave, or a square wave.

13. The antenna system of claim 12, wherein;

the at least one pair of ridge structures is shaped on the first surface to provide the physical dimensions; and the repeating pattern is along the length of the channel to compensate the physical dimensions for short-circuit effects at periodic contacts between complementary portions of the first and second surfaces by forming gaps between the periodic contacts to maintain the path dimensions.

14. The antenna system of claim 1, wherein each of the first and second structures comprises a metal injection molded metal part.

15. The antenna system of claim 14, wherein partial walls of the upper channel section or the lower channel section are metal-injection molded and have draft angles that exceed ninety degrees relative the at least one of the top surface of the first structure and the bottom surface of the second structure for enabling easier separation of the upper channel section or the lower channel section from a mold.

16. The antenna system of claim 15, wherein channel corners of the upper channel section or the lower channel section are filleted to extend the EM energy path from the channel corners into regions of the plurality of surface features for achieving an a-dimension or a b-dimension for the EM energy path that is located inside at least one of the channel width or the channel height.

17. The antenna system of claim 15, wherein an a-dimension or a b-dimension of the energy path within the partial walls is aligned to an axis that is normal to the at least one of the top surface of the first structure and the bottom surface of the second structure.

18. The antenna system of claim 1, wherein two structures provide an interface to the EM energy path for a signal processor or an antenna element to transmit or receive EM signals inferred from the EM energy directed on the energy path.

19. A method for manufacturing an antenna system, the method comprising:

forming, using metal injection molding, a first metal structure for the antenna system, the first metal structure formed to have a first surface, wherein the first surface has planar portions and is contoured to provide an upper channel section of a channel;

forming, using metal injection molding, a second metal structure for the antenna system, the second metal structure formed to have a second surface that is parallel to the first surface, wherein the second surface has planar portions and is contoured to provide a lower channel section of the channel to complement the upper channel section, wherein at least one of the first and second surfaces includes a plurality of surface features, the plurality of surface features including at least one pair of ridge structures defining physical dimensions of the channel along a length of the channel, the physical dimensions include a channel width and a channel height of a cross section of the channel, the cross section extending perpendicular to i) at least one of a top surface of the first structure and a bottom surface of the second structure, and ii) the length of the channel, and the at least one pair of ridge structures extending from the at least one of the first and second surfaces such that the second structure contacts the first metal structure via the at least one pair of ridge structures; and arranging the first metal structure relative the second metal structure to align the first surface to be opposite the second surface and provide physical dimensions of the channel formed between the upper channel section and the lower channel section, wherein forming at least one of the first metal structure or the second metal structure comprises shaping at least one of the plurality of surface features to compensate for the physical dimensions and provide an electromagnetic (EM) energy path having different path dimensions than the physical dimensions to enable a desired wavelength or frequency of EM energy to propagate through the channel.

20. The antenna system of claim 1, wherein at least one of i) the lower channel section is offset from the upper channel section such that sidewalls of the upper channel section are not horizontally in line with sidewalls of the lower channel section; and ii) the pair of ridge structures extend along the length of the channel and a cross-section of each ridge structure of the pair of ridge structures has a rounded top and extends perpendicular to the separation plane and to the length of the channel.

* * * * *